(12) United States Patent
Soucy, III et al.

(10) Patent No.: US 8,189,753 B1
(45) Date of Patent: May 29, 2012

(54) DISTRIBUTED INTERCOM SYSTEM WITH AUDIO BUS

(75) Inventors: Roger P. Soucy, III, Rochester, NH (US); John M. Cronk, Strafford, NH (US); George W. Ramsdell, Barrington, NH (US)

(73) Assignee: Russound/FMP Incorporated, Newmarket, NH (US)

( * ) Notice: Subject to any disclaimer, the term of this patent is extended or adjusted under 35 U.S.C. 154(b) by 942 days.

(21) Appl. No.: 12/082,408

(22) Filed: Apr. 10, 2008

Related U.S. Application Data

(60) Provisional application No. 60/923,047, filed on Apr. 12, 7.

(51) Int. Cl.
*H04M 1/00* (2006.01)
*H04M 1/60* (2006.01)
*H04M 9/00* (2006.01)

(52) U.S. Cl. .............. 379/159; 379/167.05; 379/167.08; 379/167.14

(58) Field of Classification Search .................. 379/159, 379/160, 164, 165, 167.04, 167.05, 167.07, 379/167.08, 167.12, 167.14, 167.15; 381/77, 381/80, 82, 85
See application file for complete search history.

(56) References Cited

U.S. PATENT DOCUMENTS

| | | | |
|---|---|---|---|
| 4,188,511 A * | 2/1980 | Smith et al. .................. | 379/158 |
| 4,538,031 A | 8/1985 | Benning et al. | |
| 4,544,411 A | 10/1985 | Wombles et al. | |
| 4,862,159 A | 8/1989 | Marusa et al. | |
| 5,131,048 A | 7/1992 | Farinelli et al. | |
| 5,440,644 A * | 8/1995 | Farinelli et al. .................. | 381/81 |
| 5,666,428 A * | 9/1997 | Farinelli et al. .................. | 381/81 |
| 5,761,320 A * | 6/1998 | Farinelli et al. .................. | 381/81 |
| 6,226,370 B1 * | 5/2001 | Shih ............................. | 379/159 |
| 6,389,139 B1 | 5/2002 | Curtis et al. | |
| 6,907,458 B2 | 6/2005 | Tomassetti et al. | |
| 7,181,023 B1 | 2/2007 | Andrews et al. | |
| 7,199,706 B2 | 4/2007 | Dawson et al. | |
| 7,346,332 B2 | 3/2008 | Louchkoff et al. | |
| 7,668,318 B2 | 2/2010 | Goldfinch et al. | |

(Continued)

FOREIGN PATENT DOCUMENTS

| | | |
|---|---|---|
| WO | WO 98/57455 | 12/1998 |
| WO | WO 01/31806 | 5/2001 |

*Primary Examiner* — Binh Tieu
(74) *Attorney, Agent, or Firm* — Hamilton, Brook, Smith & Reynolds, P.C.

(57) ABSTRACT

A distributed intercom system that interconnects a hub and various keypad and door zone units having microphones and/or speakers via CAT5 or similar cable having multiple twisted pairs. Audio is carried between all devices over a first audio wire pair, in analog signal format, forming an audio bus. Audio twisted pair acts as a data communication bus for control messages. One or more of receiver units may be active, while only one keypad device can be individually instructed to connect its corresponding microphone circuit to the audio bus. Determination of which unit is selected to be the transmitter occurs under the control of the hub. For example, in a case where a first user wishes to speak to another user in a different room, the first user presses a "talk" button at his keypad, causing that keypad to send out a message on a data communication bus to the hub. The hub unit then sends a reply on the data communication bus that grants permission to the first user's keypad to couple its microphone to the audio bus. The message is interpreted by the other stations as an instruction to keep their own microphones disconnected from the bus. A message is also sent to the desired receiving station(s) to couple their speakers to the bus to receive the audio signal.

11 Claims, 29 Drawing Sheets

U.S. PATENT DOCUMENTS

| | | |
|---|---|---|
| 7,711,126 B2 | 5/2010 | Braithwaite et al. |
| 7,826,628 B2 * | 11/2010 | Rauenzahn .................. 381/120 |
| 2003/0003556 A1 | 1/2003 | Carmichael et al. |
| 2003/0062990 A1 | 4/2003 | Schaeffer, Jr. et al. |
| 2006/0126862 A1 * | 6/2006 | Andrews et al. ................ 381/77 |
| 2006/0222153 A1 * | 10/2006 | Tarkoff et al. ................ 379/159 |
| 2011/0081028 A1 * | 4/2011 | Rauenzahn .................. 381/107 |

\* cited by examiner

| WIRE COLOR | FUNCTION |
|---|---|
| BROWN | AUDIO + |
| BROWN/WHITE | AUDIO - |
| GREEN | STATUS |
| GREEN/WHITE | GROUND |
| ORANGE | GROUND |
| ORANGE/WHITE | +15 VDC |
| BLUE | COM A |
| BLUE/WHITE | COM B |

| WIRE COLOR | POLARITY |
|---|---|
| WHITE | LEFT + |
| GREEN | LEFT - |
| BLACK | RIGHT - |
| RED | RIGHT + |

FIG. 15

| DOORBELL CHIME SWITCH SETTINGS (0 = DOWN, 1 = UP) | | | | | | | | |
|---|---|---|---|---|---|---|---|---|
| SWITCHES | DOOR 1 | | | CV* | DOOR 2 | | | |
|  | 1 | 2 | 3 | 4 | 5 | 6 | 7 | 8 |
| NONE | 0 | 0 | 0 | 0/1 | 0 | 0 | 0 | - |
| CHIME 1 | 0 | 0 | 1 | 0/1 | 0 | 0 | 1 | - |
| CHIME 2 | 0 | 1 | 0 | 0/1 | 0 | 1 | 0 | - |
| CHIME 3 | 0 | 1 | 1 | 0/1 | 0 | 1 | 1 | - |
| CHIME 4 | 1 | 0 | 0 | 0/1 | 1 | 0 | 0 | - |
| CHIME 5 | 1 | 0 | 1 | 0/1 | 1 | 0 | 1 | - |
| CHIME 6 | 1 | 1 | 0 | 0/1 | 1 | 1 | 0 | - |
| CHIME 7 | 1 | 1 | 1 | 0/1 | 1 | 1 | 1 | - |

* SWITCH 4 IS FOR CHIME VOLUME
(0 = KEYPAD ADJUSTABLE, 1 = 50% KEYPAD MAXIMUM)

FIG. 16

| HUB ID SWITCH SETTINGS (0 = DOWN, 1 = UP) | | | | |
|---|---|---|---|---|
| SWITCHES | \ HUB ID \ | | | FW* |
| | 1 | 2 | 3 | 4 |
| HUB 1 | 0 | 0 | 0 | 1 |
| HUB 2 | 0 | 0 | 1 | 1 |
| HUB 3 | 0 | 1 | 0 | 1 |
| HUB 4 | 0 | 1 | 1 | 1 |
| HUB 5 | 1 | 0 | 0 | 1 |
| HUB 6 | 1 | 0 | 1 | 1 |

*SWITCH 4 IS FOR FIRMWARE UPDATES
(0 = UPDATE MODE, 1 = USER MODE)

FIG. 17

| ZONE LABEL | ROOM NAME | ZONE LABEL | ROOM NAME | ZONE LABEL | ROOM NAME |
|---|---|---|---|---|---|
| ALCOV | ALCOVE | DINE | DINING ROOM | LOFT | LOFT |
| ATRM | ATRIUM | ENTRY | ENTRY WAY | MBATH | MASTER BATH |
| ATTIC | ATTIC | FAMILY | FAMILY ROOM | MBED | MASTER BED |
| BABY | BABY | FOYER | FOYER | NURSE | NURSERY |
| BAR | BAR | FTYRD | FRONT YARD | OFFC1 | OFFICE 1 |
| BASMT | BASEMENT | GALRY | GALLERY | OFFC2 | OFFICE 2 |
| BATH | BATHROOM | GAME | GAME ROOM | PARLR | PARLOR |
| BATH2 | BATHROOM 2 | GARDN | GARDEN | PATIO | PATIO |
| BATH3 | BATHROOM 3 | GBATH | GUEST BATH | PLAY | PLAY ROOM |
| BDECK | BACK DECK | GBED | GUEST BED | PNTRY | PANTRY |
| BED1 | BEDROOM 1 | GRAGE | GARAGE | POOL | POOL |
| BED2 | BEDROOM 2 | GREAT | GREAT ROOM | PORCH | PORCH |
| BED3 | BEDROOM 3 | GUEST | GUEST ROOM | RECRM | REC ROOM |
| BED4 | BEDROOM 4 | GYM | GYM | SAUNA | SAUNA |
| BED5 | BEDROOM 5 | JCUZI | JACUZZI | SDECK | SIDE DECK |
| BILRD | BILLIARD ROOM | KBED | KIDS BED | SHOP | SHOP |
| BKYRD | BACK YARD | KIDS | KIDS ROOM | SITRM | SITTING ROOM |
| BLCNY | BALCONY | KITCH | KITCHEN | STATE | STATE ROOM |
| CELLR | CELLAR | LAUND | LAUNDRY | STUDY | STUDY |
| COURT | COURTYARD | LIBRY | LIBRARY | SUNRM | SUN ROOM |
| DECK | DECK | LIVRM | LIVING ROOM | WKSHP | WORKSHOP |
| DEN | DEN | LOBBY | LOBBY | | |

FIG. 18

| DOOR LABEL | DOOR NAME |
|---|---|
| BDOOR | BACK DOOR |
| FDOOR | FRONT DOOR |
| GATE | GATE |
| GRAGE | GARAGE |
| SDOOR | SIDE DOOR |
| SVCDR | SERVICE DOOR |

FIG. 19

| ZONE | PORT | ZONE | PORT | ZONE | PORT |
|---|---|---|---|---|---|
| 1 | P1:H1 | 13 | P1:H3 | 25 | P1:H5 |
| 2 | P2:H1 | 14 | P2:H3 | 26 | P2:H5 |
| 3 | P3:H1 | 15 | P3:H3 | 27 | P3:H5 |
| 4 | P4:H1 | 16 | P4:H3 | 28 | P4:H5 |
| 5 | P5:H1 | 17 | P5:H3 | 29 | P5:H5 |
| 6 | P6:H1 | 18 | P6:H3 | 30 | P6:H5 |
| 7 | P1:H2 | 19 | P1:H4 | 31 | P1:H6 |
| 8 | P2:H2 | 20 | P2:H4 | 32 | P2:H6 |
| 9 | P3:H2 | 21 | P3:H4 | 33 | P3:H6 |
| 10 | P4:H2 | 22 | P4:H4 | 34 | P4:H6 |
| 11 | P5:H2 | 23 | P5:H4 | 35 | P5:H6 |
| 12 | P6:H2 | 24 | P6:H4 | 36 | P6:H6 |

FIG. 21

| DOOR STATION CALL | TOP PRIORITY (SUPERCEDES ALL OTHER EVENTS) |
|---|---|
| PAGING | INTERMEDIATE PRIORITY |
| INTERCOM | |
| LISTEN MODE | LOW PRIORITY |

FIG. 26

DISTRIBUTED INTERCOM SYSTEM WITH AUDIO BUS

RELATED APPLICATION(S)

This application claims the benefit of U.S. Provisional Application No. 60/923,047, filed on Apr. 12, 2007. The entire teachings of the above application(s) are incorporated herein by reference.

BACKGROUND OF THE INVENTION

The present invention relates generally to audio distribution systems and more particularly to an intercom system that integrates with room audio systems.

Intercom systems have been known for a number of years and have found wide applicability in both commercial and residential settings. Intercom systems enable a person to converse with persons located in other rooms, screen visitors at entryway doors, hear doorbells, release a lock on entryway doors and the like.

A typical intercom system includes a microphone and speaker located in each room or other zone where other intercom services are provided. A push button, or a more generally, a keypad unit, enables a user to manipulate the intercom system. Wiring interconnects the various units. A controller manages access to the wiring network to activate one or more of the microphones and speakers.

SUMMARY OF THE INVENTION

A system corresponding to the present invention uses a shared signal bus to carry power, data communication, and audio signals between various units. The types of units can include one or more of a basic paging keypad (ISK1), an advanced paging keypad (ISK2), a door station (ISK3), and a door strike release module (ISDR1). The various types of units are deployed in the system depending upon the user's requirements. A hub unit (ISH1) serves as a central controller.

Audio, data communication, and power signals are provided between the hub and remote units using a CAT5 cable. A CAT5 cable contains four (4) twisted pairs of insulated solid copper conductors. In one embodiment of the system, a first wire pair is used as a plus and minus power connection. A second wire pair is used for a plus and minus audio signal connection. A third wire pair is used for data communication messaging. A fourth wire pair is used for sending a status signal and a door strike release signal.

Audio is sent out to all devices over the audio wire pair, in analog signal format. Only one unit is allowed to actively source (i.e., "transmit") audio onto the audio bus at any one time. However any number of units may be actively receiving the audio. However, any particular one or more of the ISK1, ISK2, or ISK3 units can be individually instructed to connect its corresponding microphone circuit to the audio bus. Each unit connected to the bus is given a unique address so that they may be individually instructed by a central hub unit as to their behavior.

Unlike other systems, distribution of audio in the system is half-duplex, such that only one audio signal is active on the bus at any one time. In other words, only one microphone is activated at any given time, although any number of receiving amplifiers/speakers may be active.

Determination of which unit is selected to be the transmitter occurs under the control of the hub. For example, in a case where a first user wishes to speak to another user in a different room, the first user presses a "talk" button at his ISK keypad. This causes the ISK unit to send out a message on the data communication bus to the hub. The message is sent as a low bit rate message. In one embodiment, this can be according to a RS-485 serial data signaling protocol.

The hub unit then sends a reply on the data communication bus that grants permission to the first user's ISK to couple its microphone to the audio bus. This message is interpreted by the other stations as an instruction to keep their own microphones disconnected from the bus.

A message is also sent to the desired receiving station(s) to couple their speakers to the bus to receive the audio signal.

Certain ISK stations can be interfaced with speakers associated with other room audio systems. This permits another audio system, such as perhaps the user's hi-fidelity home stereo system, to be used as an interim system speaker output. In this instance, the system can interrupt the local home stereo audio to play a doorbell sound or an intercom page.

More particularly, an audio signal from an external music source (that is local to the remote unit) can be fed to a relay circuit at the ISK keypad unit. The audio signal from the local music source will normally pass through the ISK keypad unit and back to speakers within the local audio source, until the intercom at that station is used. When this happens, the relay is activated to cause a door bell sound or voice to pass to the external audio system speakers that are now switched to the intercom amplifier output. Once the intercom function is over, then the relay is returned to its original position, to again permit audio from the music system to pass to the speakers.

The state of the relay in the remote ISK unit is always controlled by the hub. The hub sends a message on the data communication bus that tells the remote keypad to activate) the relay. This message is sent in response to a button press from another ISK keypad that gets sent to the hub via the same data communication bus. The hub also informs the other keypads whether or not they are to activate their respective relays. The keypads then pass the audio signal coming over the audio bus through the keypad amplifier to the relay contacts and out to the local room speakers.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 15 illustrates the DIP switches located on the ISH1 hub unit in more detail.

FIG. 16 illustrates doorbell chime switch settings.

FIG. 17 illustrates hub ID DIP switch settings.

FIG. 18 illustrates assignable zone labels for the ISK2 Advanced Keypads.

FIG. 19 illustrates assignable door labels for the ISK2 units.

FIG. 21 illustrates a typical zone port assignments.

FIG. 26 illustrates a function priority in the system.

DETAILED DESCRIPTION OF THE INVENTION

Figure 1B:
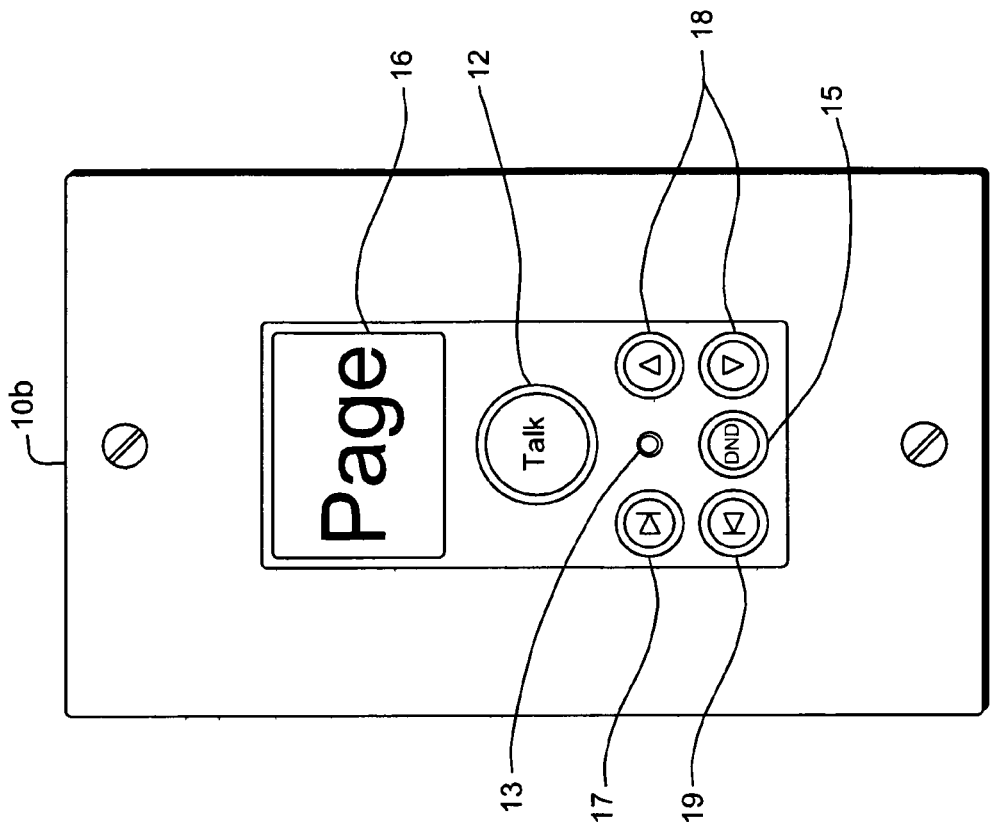
FIGS. 1A and 1B is of an ISK1 Basic Keypad and ISK2 Advanced Keypad, respectively.

A description of example embodiments of the invention follows.

I. INTRODUCTION

The following description of an example embodiment of a intercom system is arranged as an Instruction Manual having a User Section describing general system features from the perspective of a user, a Function Section describing component functions, an Installer Section describing the various technical information needed for installing, a System Functional Description containing a system modes and connection modes Programming Section, and a section.

II. INSTRUCTION MANUAL

A. User Section

The following section is an introduction to the intercom system, referred to as "ComPoint" in the description below. This high level description is from the perspective of a user, and thus is written in the second person narrative.

ComPoint integrates the following features:

System-Wide Paging

Perhaps you want to call the family to dinner, move your party guests to the living room, or summon everyone in the office to an important meeting. ComPoint's paging feature allows you to do all this with ease. You can let everybody know about an important event like a birthday or anniversary, or you can broadcast a message for someone to pick up the phone or come see you. Whatever announcement you want to make throughout your home or business, paging allows you to get the word out. What's more, if you're paging an individual, that person can reply to your page from the nearest keypad.

Point-to-Point Intercom

One of ComPoint's most useful functions is the intercom feature. You need to talk with someone in another room out of earshot, and you can't leave the room you're in. The solution? The intercom feature lets you contact the person directly, saving you steps and time. Whenever you want to reach a particular person without disturbing the whole house or office, the intercom feature connects you to the room the person is in. You can think of an intercom session as a private conversation while paging is a public announcement. Also, intercom enables two-way conversations, whereas paging is intended for one-way communication.

Door Station Call and Reply

With ComPoint, you don't have to run to the door every time the doorbell rings. If you can't get to the door right away, the door station call function gives you the convenience of answering the door from any room. At any keypad you can have a two-way conversation with the caller to find out who it is and the purpose of their visit—before you even approach the door.

Doorbell Chimes

With ComPoint, you can have separate doorbell chimes for two doors. You have a choice of seven different chime tones that your installer can assign. Or you can use a separate doorbell system if you prefer.

Door Strike Release

Did someone in the family forget their keys? Did a friend drop by? ComPoint offers an optional module that works with a door strike release to let you admit your visitor from any keypad without going to the door in person. Imagine the convenience of not having to leave the baby or interrupt an important task to go and open the door for your visitor.

Listen to Another Room

Need to keep an ear open for someone? Wondering what the kids are doing? With ComPoint you're within earshot of any other room. Listen mode keeps you in touch with what's going on in any room with a keypad.

Do not Disturb

When you've tucked your kids into bed or you need peace and quiet in the study to concentrate, you can switch the room keypad to Do Not Disturb. This prevents all communication events from being heard in that room.

Hands Free

One of the nicest features in ComPoint is the ability to reply to intercom calls without having to touch the keypad. And when the delivery person rings your doorbell, they can answer your reply without having to press the Call key again.

Integration with Your Music System

For even greater convenience, your ComPoint system can share the speakers in your multiroom audio system. When active, ComPoint switches the speakers over to the keypad amplifiers in the affected rooms, momentarily interrupting the audio program. When the activity ends, the speakers resume playing your audio program. As an alternative, ComPoint can stand alone by using the optional ISSP ComPoint Speakers next to the keypads.

The following section provides more information about each of the system components.

ISK1 Basic or ISK2 Advanced Keypad

Figure 1A:
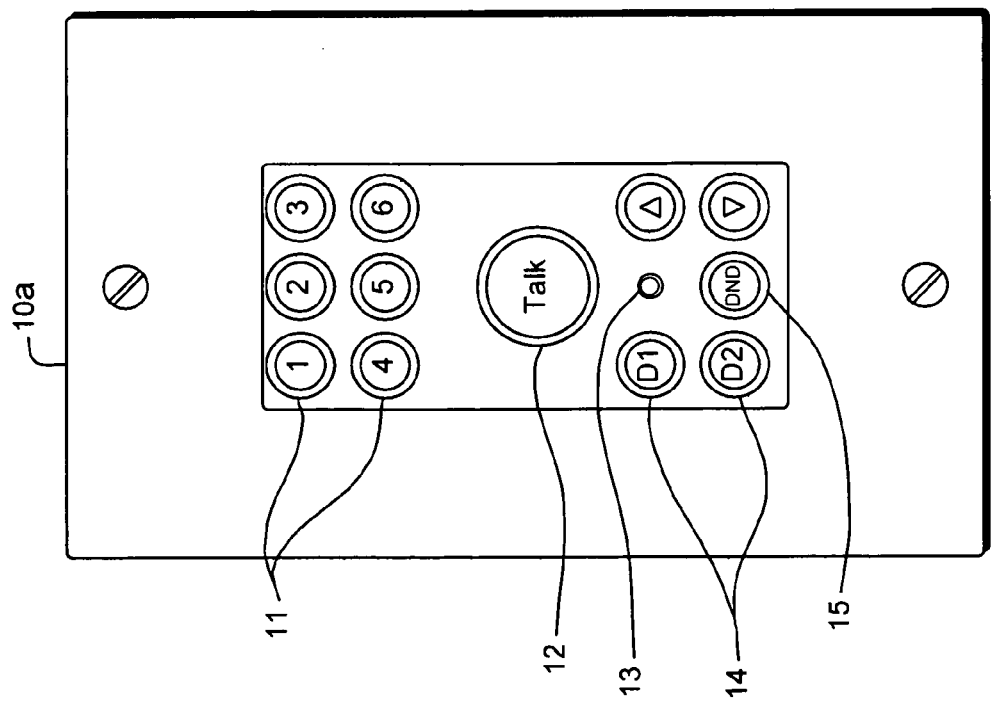

The keypads 10A, 10B control the system and serve as your interior communication points. FIG. 1A shows a front view of an ISK1 Basic Keypad 10A. FIG. 1B shows a front view of an ISK2 Advanced Keypad 10B. A simple array of keys lets you easily operate your system. In addition, each keypad contains a built-in microphone and a small amplifier to power one or two speakers.

ZONE KEYS 11—Select and indicate zones (Basic Keypad only)

TALK KEY 12—Allows communication from the keypad to other zones

MICROPHONE 13—Picks up user's voice for communications and ambient sounds for Listen mode DOOR KEYS 14—Select and indicate door stations; also activate door strike release (Basic Keypad Only)

DO NOT DISTURB KEY 15—Turns Do Not Disturb mode on and off

DISPLAY 16—Shows zone and door station labels; also indicates modes (Advanced Keypad only)

NEXT KEY 17—Scrolls forward through lists and installer menus on display (Advanced Keypad Only)

VOLUME KEYS 18—Control keypad output volume

PREVIOUS KEY 19—Scrolls backward through lists and installer menus; also activates door release with Next key (Advanced Keypad only)

ISK3 Door Station

Figure 2:
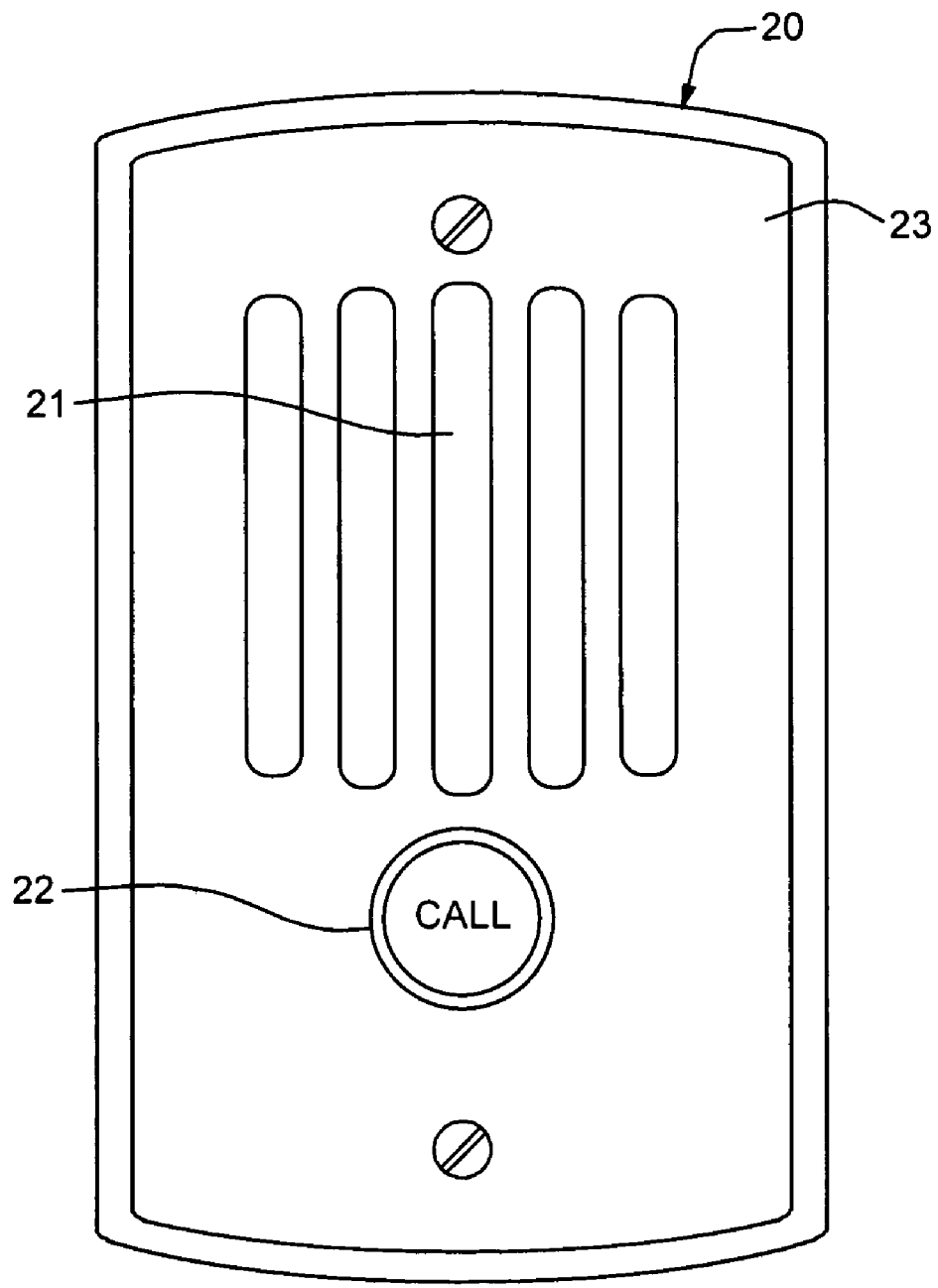
FIG. 2 is a front view of an ISK3 door station.

Designed for outdoor placement, the weatherproof door station ISK3 provides a communication link to visitors. An example ISK3 unit 20 is shown in FIG. 2. It contains a built-in microphone and a speaker for two-way communication and features a simple yet elegant one-key design.

MICROPHONE AND SPEAKER 21—Enable two-way communication

CALL KEY 22—Rings doorbell and starts a door call

WEATHERPROOF COVER 23—Protects internal components

ISH1 Hub

Figure 3:
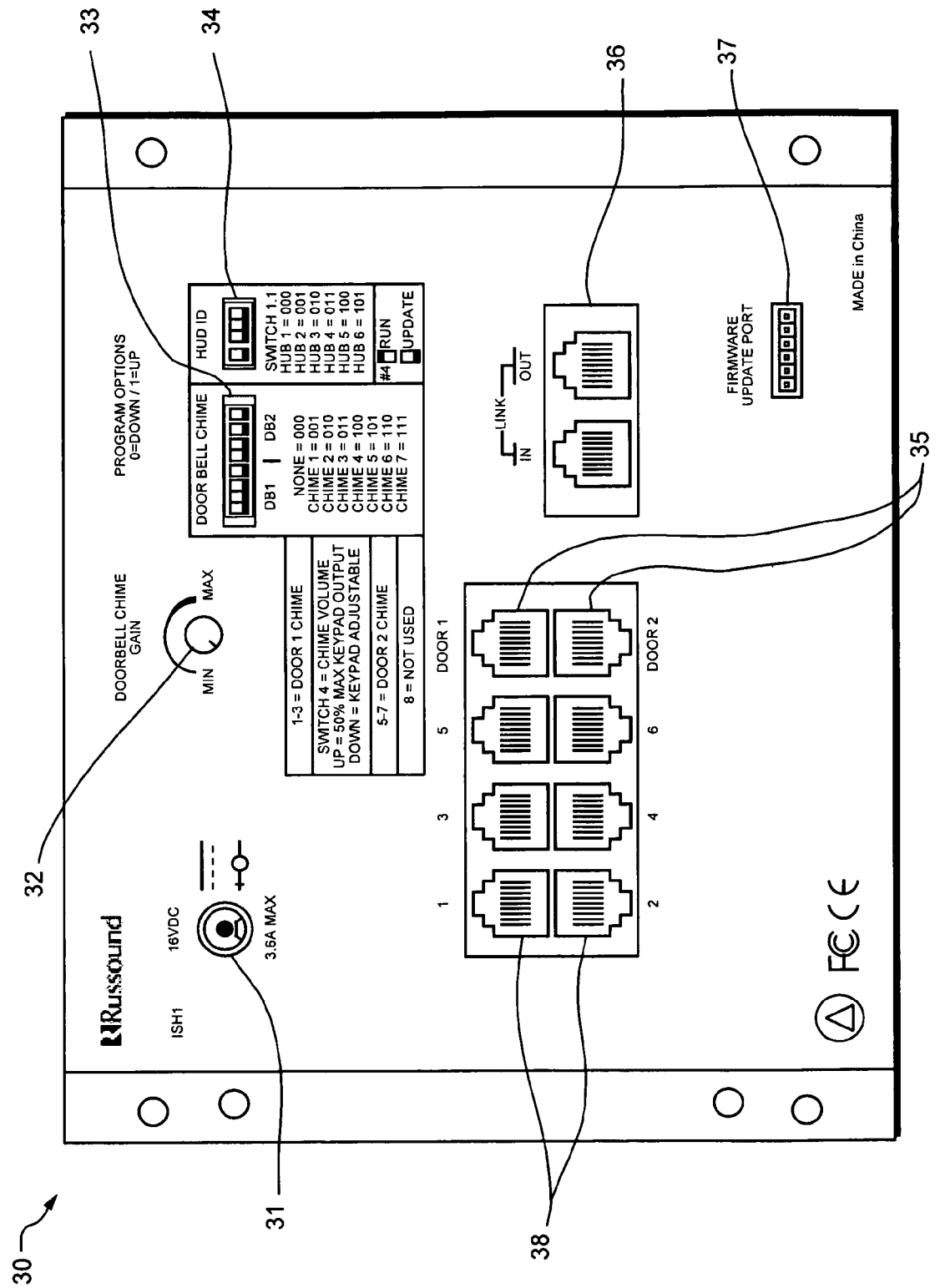
FIG. 3 is a rear view of an ISH1 hub unit.

As the heart of the system, the ISH1 hub keeps track of the zones and routes communications appropriately. It also provides your choice of chime sounds for the built-in doorbell feature, which plays chimes through the speakers in each room. FIG. 3 is a rear view of an ISH1 hub 30.

POWER INPUT 31—For connecting a power supply, e.g., 15 VDC at 3.5 A

DOORBELL CHIME GAIN CONTROL 32—For adjusting the overall volume of the doorbell chimes DOORBELL CHIME SWITCHES 33—For selecting individual chime tones for one or two door stations HUB ID SWITCHES 34—For assigning the hub a unique ID number in a multiple-hub system DOOR STATION PORTS 35—For connecting ISK3 Door Stations LINK PORTS 36—For connecting multiple hubs together FIRMWARE UPDATE PORT 37—For updating system firmware from a computer ZONE KEYPAD PORTS 38—For connecting ISK1 Basic or ISK2 Advanced Keypads ISDR1 Door Strike Release Module This optional module 40 provides a connection point for a separate door strike release unit, making it possible to unlock the door from any keypad. See FIG. 4.

OUTPUT CONNECTOR—Punch-down connector for CAT-5 cable to an ISK3 Door Station

INPUT CONNECTOR—Punch-down connector for CAT-5 cable from the ISH1 hub

RELAY OUTPUT CONNECTOR—Removable connector for a door strike release, gate actuator, or other device.

ISSP ComPoint Speaker

Figure 5:
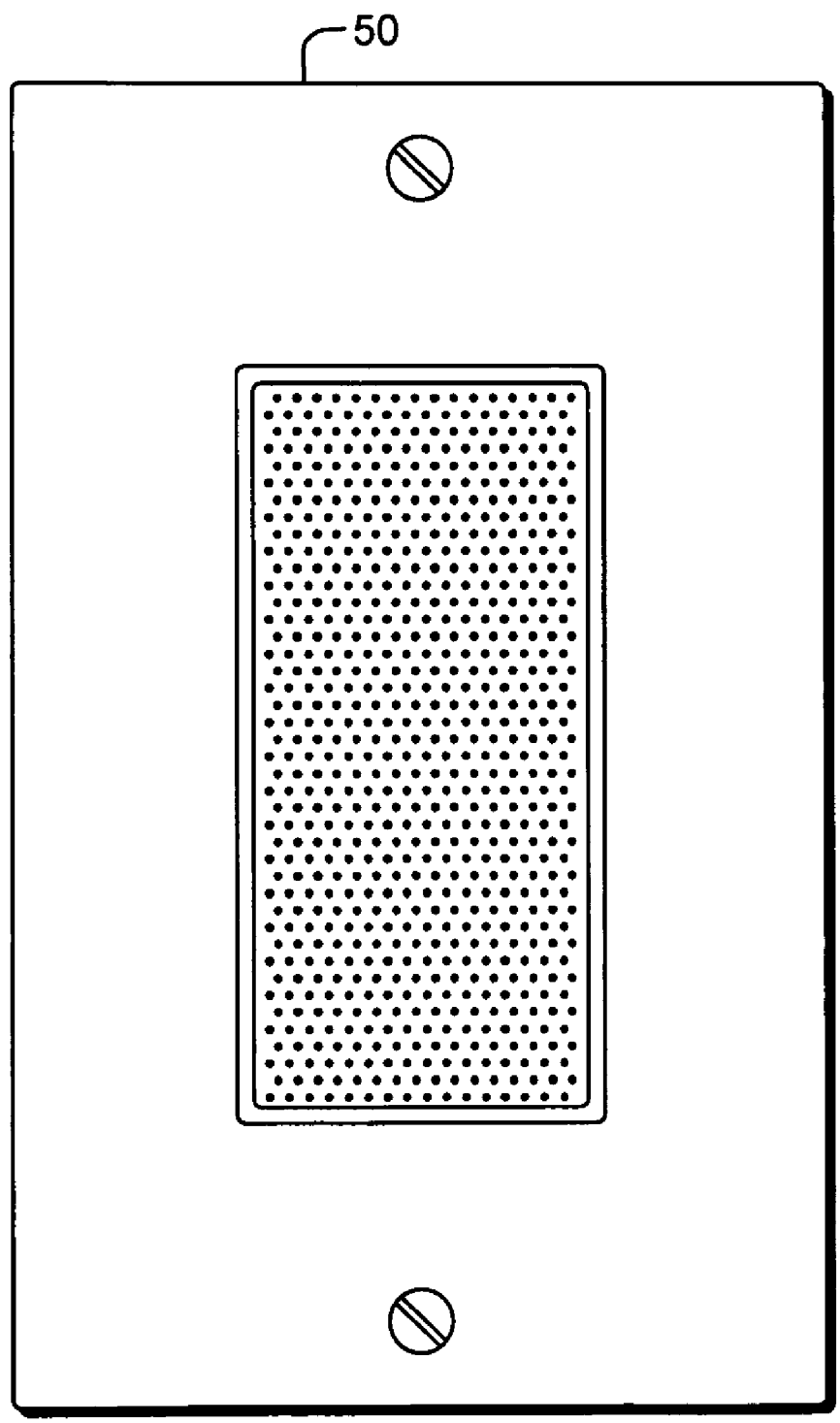
FIG. 5 is a front view of an ISSP speaker module.

This optional in-wall speaker 50 sits beside a Basic or Advanced keypad in a room without multiroom audio system speakers. It can also be used in every room when ComPoint is used as a stand-alone system. FIG. 5 is an example front view of an ISSP unit 50.

B. Function Section

With ComPoint, we refer to areas with keypads as "zones". A zone may be a single room or an area with more than one room, such as a kitchen and dining area. Every communication has a sender and a receiver. With ComPoint, we call any zone that starts a communication the sending zone. The zone or zones to which the communication is sent are receiving zones, even though they may reply to the initial communication. For an intercom session, the receiving zone is also the target zone. Certain communications take priority over others. A door station call interrupts any other communication in progress. Paging is allowed only when there is no door station call or intercom session already under way. An intercom session is allowed only when there is no door station call or page in progress. Paging and intercom interrupt Listen mode.

Your ComPoint system is configured with either ISK1 Basic or ISK2 Advanced keypads. The way you use your system and the way it gives you information depends on which keypads you have.

With either keypad, pressing the Talk key sounds a ping tone in the receiving zones to announce your message. Releasing the Talk key sounds a double ping.

If the system is already in use when you try to send a page or start an intercom session, the Talk key blinks red for 7 seconds to let you know the system is busy. Also, the Advanced Keypad indicates Busy on its LCD panel.

Paging

Paging lets you send an announcement throughout your home or business from any keypad. To send a page, just press and hold the Talk key (see FIGS. 1A and 1B), then speak. Release the key when you're done.

Your page will be heard in all zones except those that are in Do Not Disturb mode. For privacy and to avoid disturbing your neighbors, your page will not be heard at either door station.

If a zone key is lit red on the Basic Keypad, press the key to deselect that zone before you press the Talk key to send a page.

If a zone label appears on the Advanced Keypad, use the Next or Previous key to select Page before you press the Talk key. All keypads indicate which zone is sending a page, so you'll know where it's coming from. The zone indication remains for 30 seconds after the Talk key is released to simplify replying to the page.

The keypads in the receiving zones also sound a double ping when the Talk key is released. This lets you know the person sending the page is done speaking and you can reply to the page. Within 30 seconds, simply press and hold the Talk key and speak. Your reply will be heard only in the zone that sent the page.

If you wish to reply to the page after the 30-second limit, you can use the intercom to function described below or a return page to send your reply.

Intercom

Unlike a system-wide page, an intercom session occurs only between two zones. To send an intercom, select a target zone on a keypad. Press and hold the Talk key and speak. Release the Talk key when you're done speaking.

Basic Keypad. Press and release a zone key (FIG. 1A) to select the target zone. The key lights up red to indicate the zone is selected. If the selected target zone is in Do Not Disturb mode, the zone key and DND key blink rapidly for 7 seconds.

Advanced Keypad. Select a target zone by using the Previous or Next key (FIG. 1B) to scroll through the list of available zones until the display shows the zone you want for the intercom session.

Selecting a target zone on the Basic Keypad If the selected zone is in Do Not Disturb mode, the display alternately shows the zone label and DND at 1-second intervals and the DND key blinks rapidly for 7 seconds.

Receiving an intercom. When the Talk key is pressed on the sending keypad, the receiving keypad indicates which zone is sending the intercom. Also, both the sending and receiving keypads sound a single ping to let you know you can reply hands free within 7 seconds. After the 7 seconds, the keypads sound a double ping to signal the end of the hands-free reply period. After the double ping, you can reply within 30 seconds by pressing and holding the Talk key while you speak. After 30 seconds you can no longer reply, but you can start another intercom session to the zone that sent the original message.

Door Station Call

A visitor can ring the doorbell and start a door station call by simply pressing and releasing the Call key (FIG. 2). When the Call key is pressed, all keypads indicate the calling door station for 15 seconds.

The D1 or D2 key on the Basic Keypad blinks red and the display on the Advanced Keypad (FIG. 1B) shows Door1, Door2, or an installer-assigned door label. The keypads also sound a doorbell chime, as long as they aren't in Do Not Disturb mode and a chime option is selected on the hub. Additionally, the door station can ring a traditional doorbell system as well.

A door station call takes precedence over paging and intercom sessions and thus interrupts them if they're in progress when the Call key is pressed.

To reply to a door station call, press and hold the Talk key on a keypad within 15 seconds and speak. Release the Talk key when you're done speaking. When you release the Talk key, the door station sounds a single ping to let the caller know they can answer your reply.

Note: You must use the Talk key to reply to a door station call. For your privacy, ComPoint doesn't allow a hands-free reply to a door station call.

After you reply to a door station call, the caller has 7 seconds to answer your reply hands free. After 7 seconds, the door station pings twice to indicate the time is up. If more than 15 seconds have passed since the door call, you can reselect the door station and press the Talk key to start a new session. This does not ring the doorbell.

Door Strike Release

If your ComPoint system includes optional ISDR1 Door Strike Release Modules, you can activate them from a keypad to unlock the doors. The ISDR1 itself does not unlock the door; rather, it provides a switch to control a separate door strike release unit to unlock the door.

Basic Keypad. Press and hold the corresponding door station key for 3 seconds. The module then activates for 3 seconds and the keypad and door station confirm activation with a buzz tone.

Figure 6B:
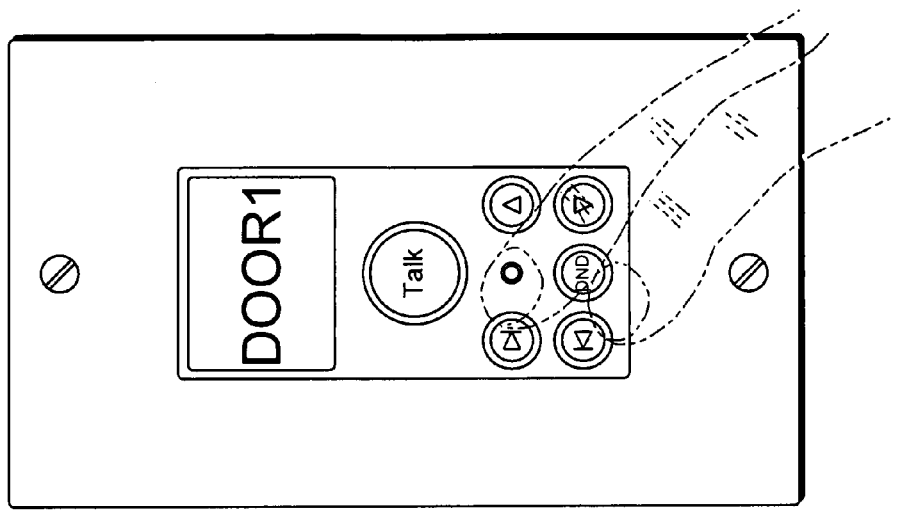
FIGS. 6A and 6B illustrate a procedure for releasing a door strike on the Advanced Keypad.
Figure 6A:
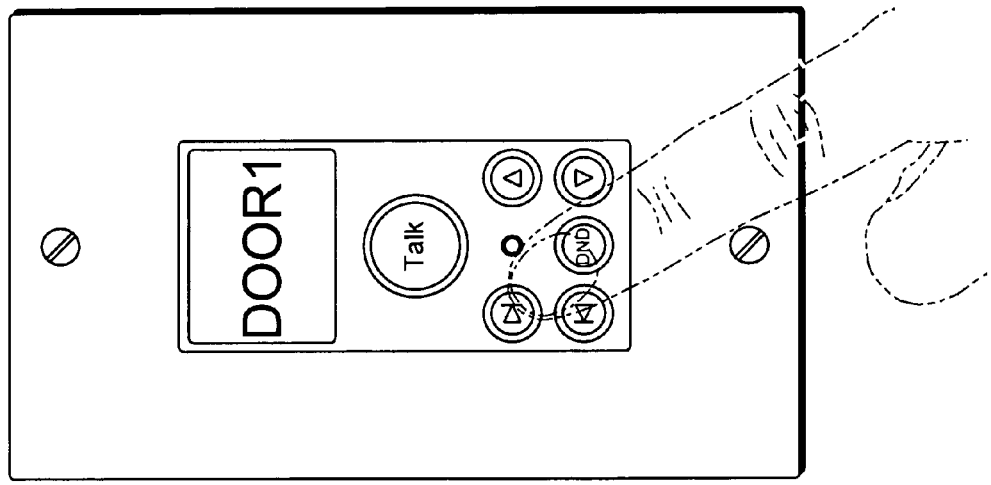

Advanced Keypad. During a door call, press and hold both the Previous and Next keys at the same time for 3 seconds. When there is no current door call session, first press the Previous or Next key to scroll through the list to the door label (FIG. 6A). Then press and hold both keys for 3 seconds (FIG. 6B). The module then activates for 3 seconds and the keypad and door station sound a buzz tone to confirm activation.

Listen Mode

You can use your ComPoint system to continuously listen to any single zone from one or more other zones. To do this, first turn on a keypad microphone in the zone you want to listen to, then select that zone on one or more other keypads. Other communication events have priority over Listen mode but only temporarily interrupt it.

Figure 7B:
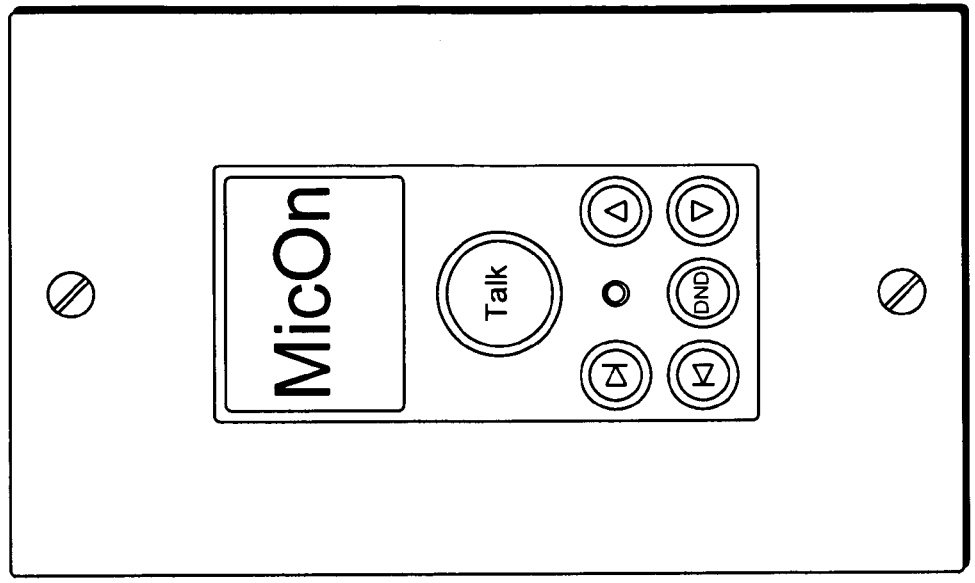
FIGS. 7A and 7B illustrate a "microphone on" indication for both a Basic and Advanced keypad.
Figure 7A:
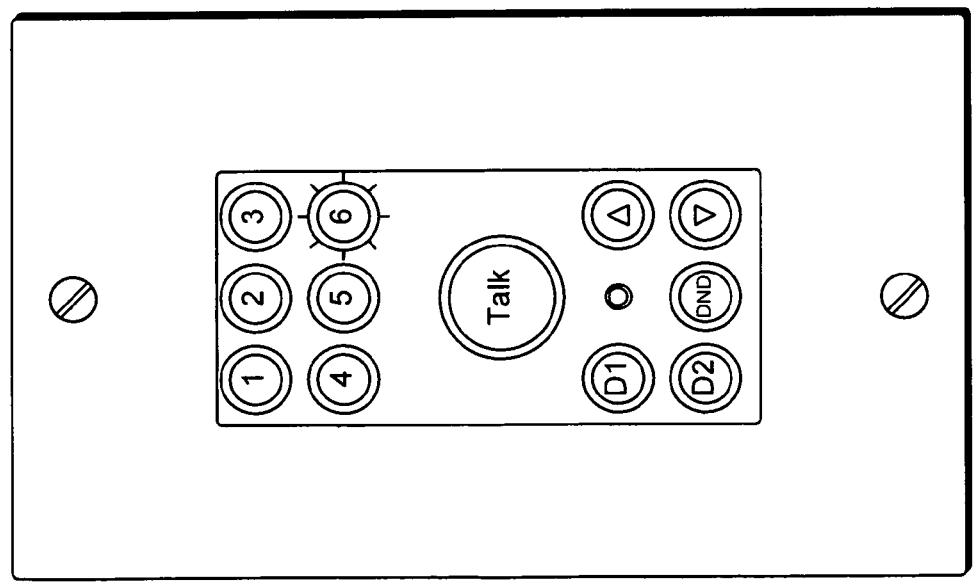

To turn on a zone microphone, select that zone on its own keypad. The Talk key lights up red to indicate the keypad's microphone is active. On a Basic keypad, the zone key blinks (FIG. 7A) and on an Advanced Keypad, the zone label changes to MicOn after 2 seconds (FIG. 7B). Note: Only one zone microphone can be on at once.

Figure 8B:
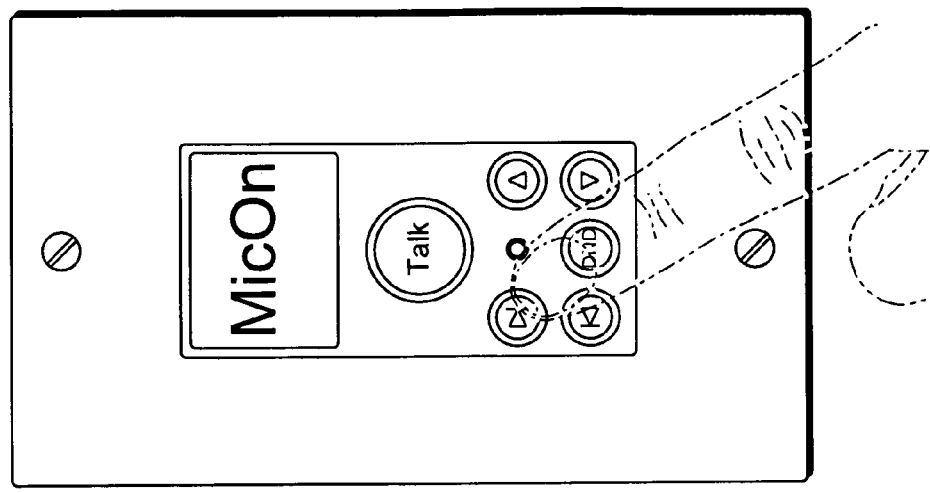
FIGS. 8A and 8B show how listen mode is selected on the Basic and Advanced Keypads.
Figure 8A:
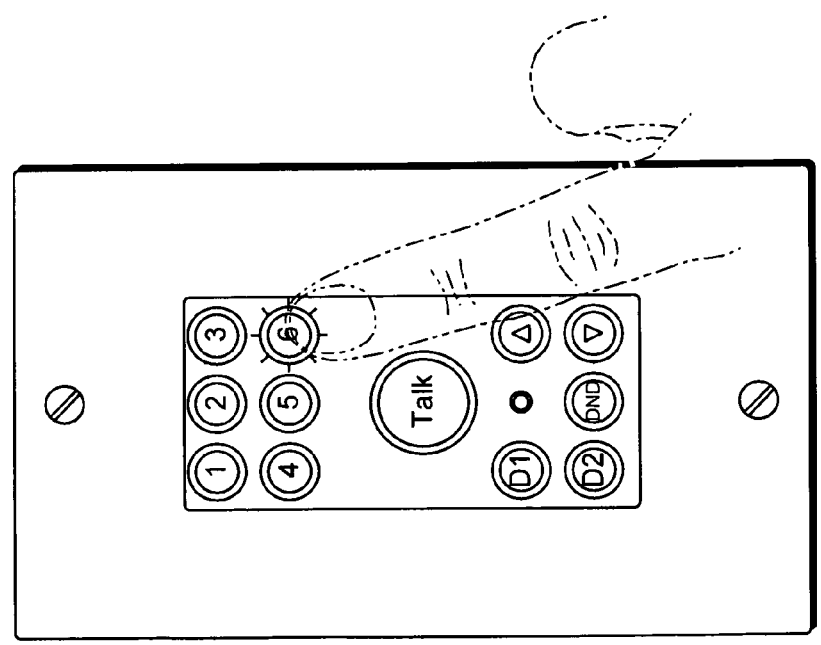

Basic Keypad. To listen to the zone with the active microphone, press the zone key (FIG. 8A). The key blinks three times (e.g., zone "6") and then remains lit red to indicate selection of the zone with the active microphone.

Advanced Keypad. To listen to the zone with the active microphone, press the Previous or Next key to select the zone (FIG. 8B). The display will alternately toggle between the zone label and Listn as long as the active zone is selected.

To cancel Listen mode with either type of keypad, deselect the zone you are listening to on the keypad in that zone. Listen mode cannot be canceled from any other zone.

Do not Disturb Mode to The Do Not Disturb (DND) feature allows you to prevent pages, intercom sessions, door station calls, and doorbell chimes from being heard in a zone. Thus, you can use DND mode to prevent interruption of a multiroom audio program in that zone. To turn on DND mode, press and release the DND key. The DND key lights up red to indicate the zone is in DND mode. To cancel DND mode, press any key on the keypad other than Volume Up or Volume Down.

Combined Listen and DND Modes

You can use DND mode on a keypad you are listening to in Listen mode. This way the zone you're listening to won't be disturbed by the doorbell or other communication events.

To set up a zone for Listen mode and DND, first activate the keypad's microphone by selecting that zone on the keypad. Then turn on DND.

The Talk key and DND key light up red to indicate the keypad's microphone is on and the zone is also in DND mode. On a Basic Keypad, the zone key also blinks. On an Advanced Keypad, the display also shows MicOn.

Another Advanced Keypad listening to that zone alternately displays the zone label, Listn, and DND.

C. Installer Section

This section provides technical information for installing and programming the ComPoint system. It also provides detailed descriptions of the system functions.

1. System Summary

Figure 9:
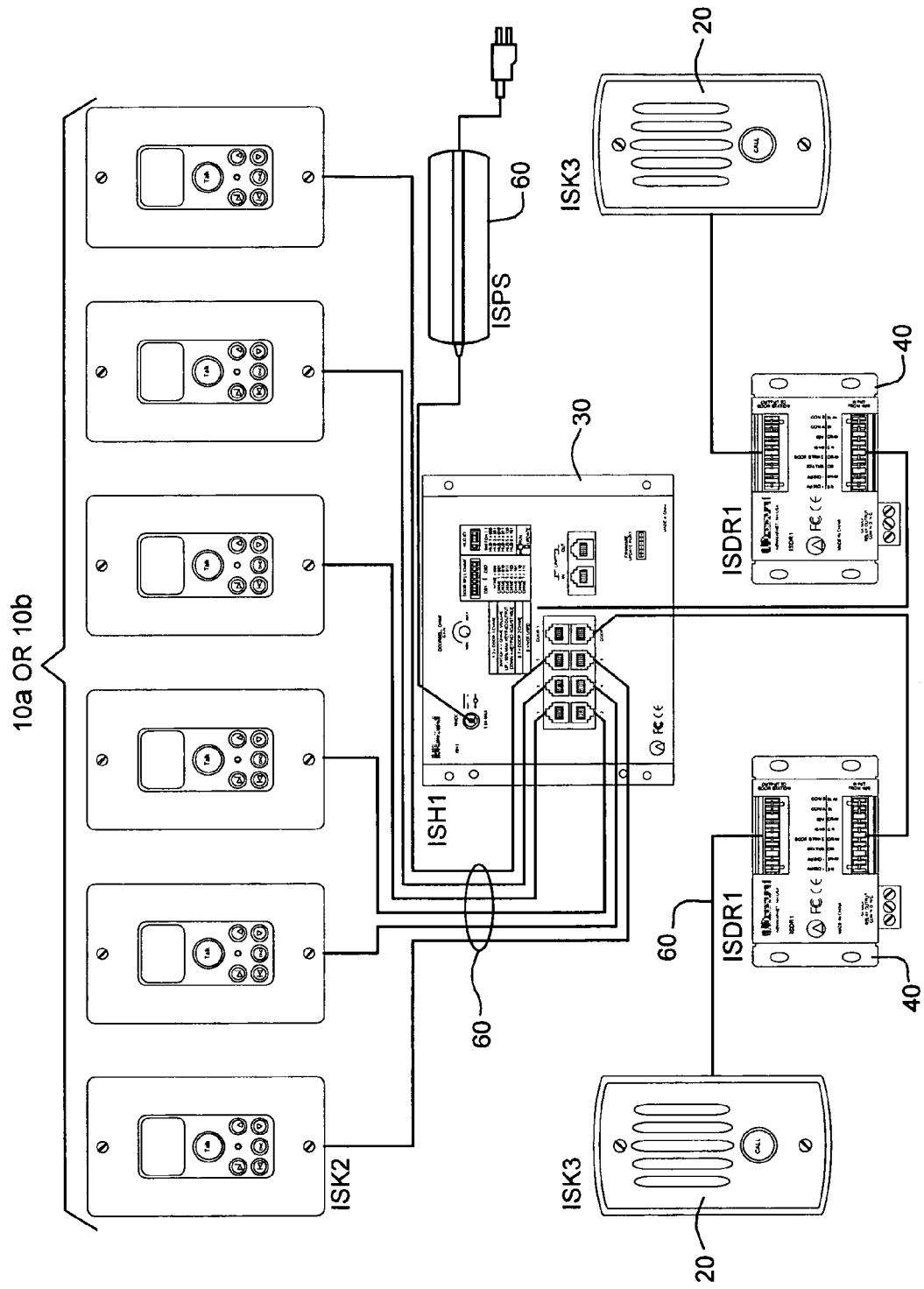
FIG. 9 is a system diagram showing the interconnection of keypads, door stations, hub units, and door strike release.

Referring to FIG. 9, a ComPoint system 100 uses one or more central ISH1 hubs 30, each of which supports up to 6 keypads (10A, 10B). Each keypad (e.g., ISK1, ISK2, etc.) is addressable by its own unique ID number assigned by the hub.

ComPoint units connect to each other with CAT5 cable, which conveys power, ground, audio, and data between the components. The cable length limit for any zone or door station is 250 feet (76 m). The system 100 can include one or two door stations ISK3 20 connected to a first hub (hub #1). Each door station has its own unique ID number, permanently assigned in the system firmware.

Each door station 20 may also have a corresponding door strike release module ISDR1 40 wired in line between the hub and the station.

Simple system programming is required to assign the hub ID numbers, doorbell chimes, and when ISK2 Advanced Keypads are used, zone and door labels.

ISH1 Hub

As the central controller for the ComPoint™ system, the ISH1 Hub 30 performs all communications routing. It addresses the keypads and door stations according to the ports they're connected to. As shown in FIG. 3, the hub has ports 38 for up to 6 zone keypads. Up to 6 ISH1 Hubs can be linked together for a maximum of 36 zones (via the Link ports 36). With multiple hubs, each hub must be assigned a unique ID number during installation. The hub also has ports 35 for 2 door stations. In a system with multiple linked hubs, only the hub with ID number 1 supports the door stations. A separate doorbell chime tone can be selected on hub 1 for each door. These chime selections take effect for the entire system and play through all the zone keypads.

The hub's firmware contains lists of zone and door labels for display on the ISK2 Advanced Keypads. These labels are assigned by the installer using a connected ISK2 keypad. (See elsewhere in this document for instructions on assigning labels.) Designed for surface mounting or installation in a structured wiring panel, the ISH1 Hub uses an external model ISPS power supply to conserve chassis space. It should be located near an electrical outlet. The hub includes a port for updating its firmware from a computer.

A complete list of the ports shown in FIG. 3 is as follows:
POWER INPUT 31—For connecting model ISPS power adapter
DOORBELL CHIME GAIN CONTROL 32—For adjusting overall chime volume
DOORBELL CHIME SWITCHES 33—For assigning chimes to door 1 and door 2
HUB ID SWITCHES 34—For assigning hub ID number
DOOR STATION PORTS 35—For connecting ISK3 door stations
LINK PORTS 36—For connecting multiple ISH1 hubs
FIRMWARE UPDATE PORT 37—For updating device firmware from a connected computer
ZONE PORTS 38—For connecting ISK1 or ISK2 zone keypads Wiring and Connections The ISH1 Hub connects to the keypads and door stations with CAT-5 cable. The length limit for the CAT-5 cable is 250 feet (76 m).

Run CAT-5 from the hub location to every keypad and door station location. If you are installing optional ISDR1 modules, loop the door station cables through the module locations. When running CAT-5 and speaker cables, avoid AC power wiring. If you have to run the cables parallel to electrical wiring, space the cables at least two feet (0.6 m) from the AC power lines.

Figure 12:
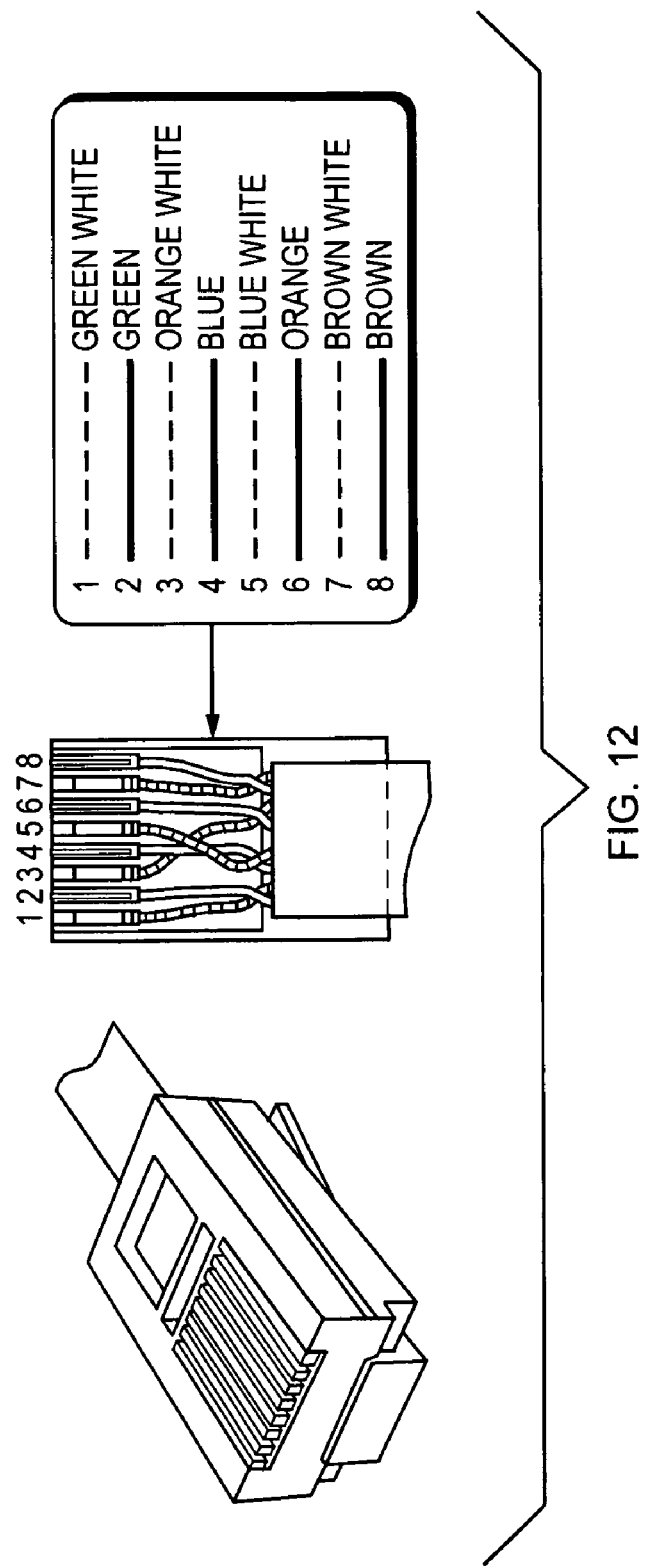
FIG. 12 illustrates an 8-pole modular T568A connection used between units.

The hub has 8-pole modular jacks for keypad and door station connections. These connections must be made according to the T568A standard as shown in the diagram of FIG. 12.

The hub also uses modular jacks for the link ports. Use a short 8-pole, 4-twisted-pair straight-through RJ-45 patch cable to link hubs together.

Programming

All system programming resides in firmware located in the ISH1 Hub. For a six-zone system with ISK1 Basic Keypads, programming consists only of setting the doorbell chimes. For a system with ISK2 Advanced Keypads, programming includes assigning zone and door station labels. For a system with more than six zones, programming includes setting hub ID numbers. When multiple hubs are used, the zone and door label settings are initially stored in the hub to which the keypad is connected. Upon exiting the programming procedure, the settings are copied to the other hubs.

More details of system functions implemented in the system are contained elsewhere in this document.

Hub 1 serves as the master hub for storing all zone and door label settings. Whenever the system power is cycled, the settings are copied from hub 1 to the other hubs.

Hub ID Numbers

In a system with multiple ISH1 Hubs, each hub must have a unique ID number. This is manually assigned on the 4-switch HUB ID DIP before the system is powered up. To assign the ID number, set switches 1 through 3 as shown in table 1.

Switch 4 enables a programming mode for updating the system firmware. Leave this switch in the up position for system operation.

Doorbell Chimes

A single 8-switch DIP assigns doorbell chimes for both door stations. Switches 1 through 3 select the chime for door 1 and switches 5 through 7 select the chime for door 2. There are 7 chime options, with a setting for no chime when a separate doorbell system is used. To select the chimes, set the switches as shown in table 2.

Switch 4 selects how the chime volume level is managed. Setting the switch to 1 (up) sets the chime volume level to a fixed level at 50% of the maximum keypad output in all zones. This causes the chime to play at the same level in all zones. Setting the switch to 0 (down) allows the chime volume to be determined by the keypad volume level setting in each zone independently.

Switch 8 is currently not used.

The ISH1 Hub also has a trim potentiometer for setting the overall volume of the doorbell chime throughout the system. This can be used to adjust the chime level relative to the communication level. Note: In a system with multiple linked hubs, only the settings on hub 1 affect the doorbell chime assignments and volume level, since the door stations connect only to hub 1. Because the settings take effect immediately, the doorbell chimes can be set at any time. There is no need to cycle the power after setting them.

3. System Keypads

ComPoint keypads 10A, 10B (also called "zone units" herein) are designed to be simple, intuitive interfaces for the user. Each model has a Talk key, volume keys, and a DND key for setting the zone in Do Not Disturb mode. Both models have installer-selectable amber or green backlighting that turns on when the system is used and turns off after the system is inactive for 60 seconds. A built-in microphone with automatic gain control picks up the user's voice.

The keypads require external speakers, which are driven by the keypad amplifiers for communications. By using built-in speaker relays, the keypads can share the speakers used in a multiroom audio system. When the ComPoint hub indicates, the relays switch the speakers from the audio system to the keypad amplifiers in the affected zones, momentarily interrupting the audio program. When the activity ceases, the speakers are switched back to the audio system.

Such a distributed audio integration function is accomplished by interruption of the speaker wires feeding the distributed audio speakers in the particular room during use. Both paging keypad types have a 2nd 4 position detachable connector for input labeled 'In from Amplifier' that accepts the speaker level audio from a distributed audio system. A 4-pole relay toggles the speakers from the internal amplifier to the distributed audio system. When the zone is in a standby state, the distributed audio system is still the default feed for the speakers in the room.

In the absence of a multiroom audio system, or in zones that are not shared with an audio system, the ISSP ComPoint speaker 50 can be used or the keypads can be wired directly to in-wall, in-ceiling, or surface-mounted speakers. The keypad amplifier is monaural, but the relay passes stereo signals from the audio system to the speakers.

The keypad volume keys adjust the listening level for communications by controlling the keypad's amplifier output. They have no effect on the room volume for a connected audio system. The volume keys signal the hub to send a ping tone as an audible cue for the volume level when there is no communication taking place. Once the volume adjustment reaches either end of the range, the ping tone no longer sounds.

The hub microprocessor addresses keypads by sending out to them on a 'status' line in the CAT5 a low bit rate message to give the paging keypads their own ID# which will to correspond to the port # they are plugged into.

3.1 ISK1 Basic Keypad

The ISK1 Basic Keypad 10A (FIG. 1A) is designed for use in a system with no more than six zones. Pressing a zone key selects a target zone for an intercom session.

The ISK1 Basic Keypad is a single-gang Decora®-style in-wall keypad for use in a ComPoint™ intercom system with up to six zones. Besides a Talk key, it has keys for selecting target zones and door stations, adjusting volume, and enabling Do Not Disturb mode. The keypad has installer-selectable amber or green key backlighting. The keypad uses one or two external speakers. A built-in speaker relay allows it to share speakers with an audio system for high-fidelity communications. User input keys are shown in FIG. 1A.

ZONE KEYS 11—Select zones for intercom sessions and indicate zones originating communications TALK KEY 12—Activates microphone for outgoing communications DOOR KEYS 14—Select and indicate door stations; also activate door strike release module MICROPHONE 13—Picks up user's voice for communications and ambient sounds for Listen mode VOLUME KEYS 15—Control keypad output volume DND KEY 16—Enables and disables Do Not Disturb mode for the zone Operation The ISK1 Keypad allows you to perform the following functions:

System-wide paging
Point-to-point intercom
Call and reply to door station
Door strike release
Listen to another zone It also allows you to put the zone in Do Not Disturb mode to prevent communications and doorbell chimes from being heard in the room where it's installed.

Paging

To send a page, press and hold the Talk key and speak. Release the key when you're done speaking.

If one of the zone keys is lighted red before you press the Talk key, first press the zone key to deselect that zone before you send the page. Otherwise, your message will go only to the selected zone.

If the system is busy when you press the Talk key, the Talk key blinks red for 7 seconds.

When you press the Talk key, all keypads sound a single ping tone to announce your message. They also indicate which zone you're sending from by lighting the zone key red. The zone indication remains for 30 seconds after you release the Talk key.

The keypads also sound a double ping when you release the Talk key. This lets others know they can reply to the page within 30 seconds.

To reply to a page from another zone within the 30-second limit, press and hold the Talk key and speak. Your reply will be heard only in the zone that sent the page. Paging is not allowed when there is a door station call, intercom session, or other page in progress. Also, a door station call takes precedence over a page and thus interrupts a page in progress.

Intercom

To talk with someone in another zone, first press and release that zone's key. The key lights up red to indicate the zone is selected. Press and hold the Talk key and speak. Release the Talk key when you're done speaking. If the system is busy when you try to start an intercom session, the Talk key blinks red for 7 seconds.

If the selected zone is in Do Not Disturb mode, the zone key and DND key blink rapidly for 7 seconds.

When you press the Talk key on the sending keypad, the receiving keypad sounds a single ping and indicates the sending zone by lighting up that zone's key in red.

When you release the Talk key, both the sending and receiving keypads sound a single ping to signal the person receiving can reply hands free within 7 seconds.

After the 7 seconds, the keypads sound a double ping to signal the end of the hands-free reply period. To reply to an intercom from another zone before the double ping, just speak. After the double ping, press and hold the Talk key while you speak. You can reply as long as the sending zone's key is lighted red.

An intercom session is not allowed when there is a page, door station call, or other intercom session in progress. Also, a door station call takes precedence and thus interrupts an intercom session in progress.

Door Station Call

The door station call function gives you the convenience of answering the door from any keypad.

When a visitor rings the doorbell from a door station, all keypads indicate the calling door station for 15 seconds by lighting the door key red.

To reply to a door station call within the 15 seconds, press and hold the Talk key on a keypad and speak. Release the Talk key when you're done speaking.

Please note that you must use the Talk key when replying to a door station call. For your privacy, ComPoint does not allow a hands-free reply to the door station. When you release the Talk key, the door station sounds a single ping to let the caller know they can answer your reply hands free within 7 seconds. After the 7 seconds, the door station pings twice to indicate the end of the communication.

After 15 seconds, you can reconnect by selecting the door station on the keypad and pressing the Talk key to start a new intercom session. This does not ring the doorbell.

Door Strike Release

If your ComPoint system includes an optional ISDR1 Door Strike Release Module, you can activate it from a keypad to unlock the door.

To activate a Door Strike Release Module, press and hold the appropriate door station key for 3 seconds. The module then activates and the keypad confirms activation with a buzz tone through the speakers.

Listen to Another Zone

You can use your ComPoint system to continuously listen to any single zone from one or more other zones. This is done by first turning on a keypad microphone in the zone you want to listen to, then selecting that zone on one or more other keypads.

To turn on a keypad's microphone, select the keypad's own zone on that keypad. The Talk key lights up red and the zone key blinks to indicate the microphone is active. To listen to the zone with the active microphone from other keypads, select that zone on the other keypads. The zone key on each keypad blinks three times and then remains lighted red to indicate the system is in Listen mode.

To exit Listen mode, press any key other than Volume Up or Volume Down in the zone you're listening to. Listen mode cannot be disabled from any other zone. Other communication events have priority over Listen mode and thus interrupt listening to another zone.

Do Not Disturb Mode

You can prevent pages, intercom sessions, door station calls, and doorbell chimes from being heard in any zone by using Do Not Disturb (DND) mode.

To turn on DND mode, press and release the DND key.

The DND key lights up red to indicate DND mode is on. To cancel DND mode, press any key other than Volume Up or Volume Down. The red DND light shuts off.

Combined Listen and DND Modes

You can use DND mode in a zone you are listening to. This way the zone you're to listening to won't be disturbed by the doorbell or communication events.

To set up a zone for listening and DND, first select that zone on its own keypad. Then press and release the DND key.

The Talk key and DND key light up red and the zone key blinks to indicate the keypad's microphone is on and the zone is also in DND mode.

Volume Adjustment

To adjust the output volume of the keypad, press either the Volume Up or Volume Down key. This affects the volume of all communications heard in that zone, and depending on how the system hub is configured, may also affect the doorbell volume in the zone. The Volume Up and Volume Down keys do not affect the volume of the multiroom audio program in the zone.

Installation and Trim

The ISK1 Keypad is designed to install in a standard US electrical plastic wall box with an internal volume of at least 18 cubic inches (295 cm$^3$). The keypad occupies a single gang and accepts a Decora® wall plate. For the best accessibility, viewability, and microphone reception, we recommend installing the keypads at a standard thermostat height of 58 to 60 inches (1.5 m). This may vary according to personal preferences or requirements.

Wiring to ComPoint system components interconnect with CAT-5 cable. Run CAT-5 from the hub location to every keypad location. If the ComPoint system is sharing speakers with an audio system, loop the speaker cables through the keypad locations. If dedicated speakers are being used, run the speaker cables to the keypads. When running CAT-5 and speaker cables, avoid running them near AC power wiring. If you have to run the cables parallel to electrical wiring, space the cables at least two feet (0.6 m) from the AC power lines.

Connections

Figure 10A:
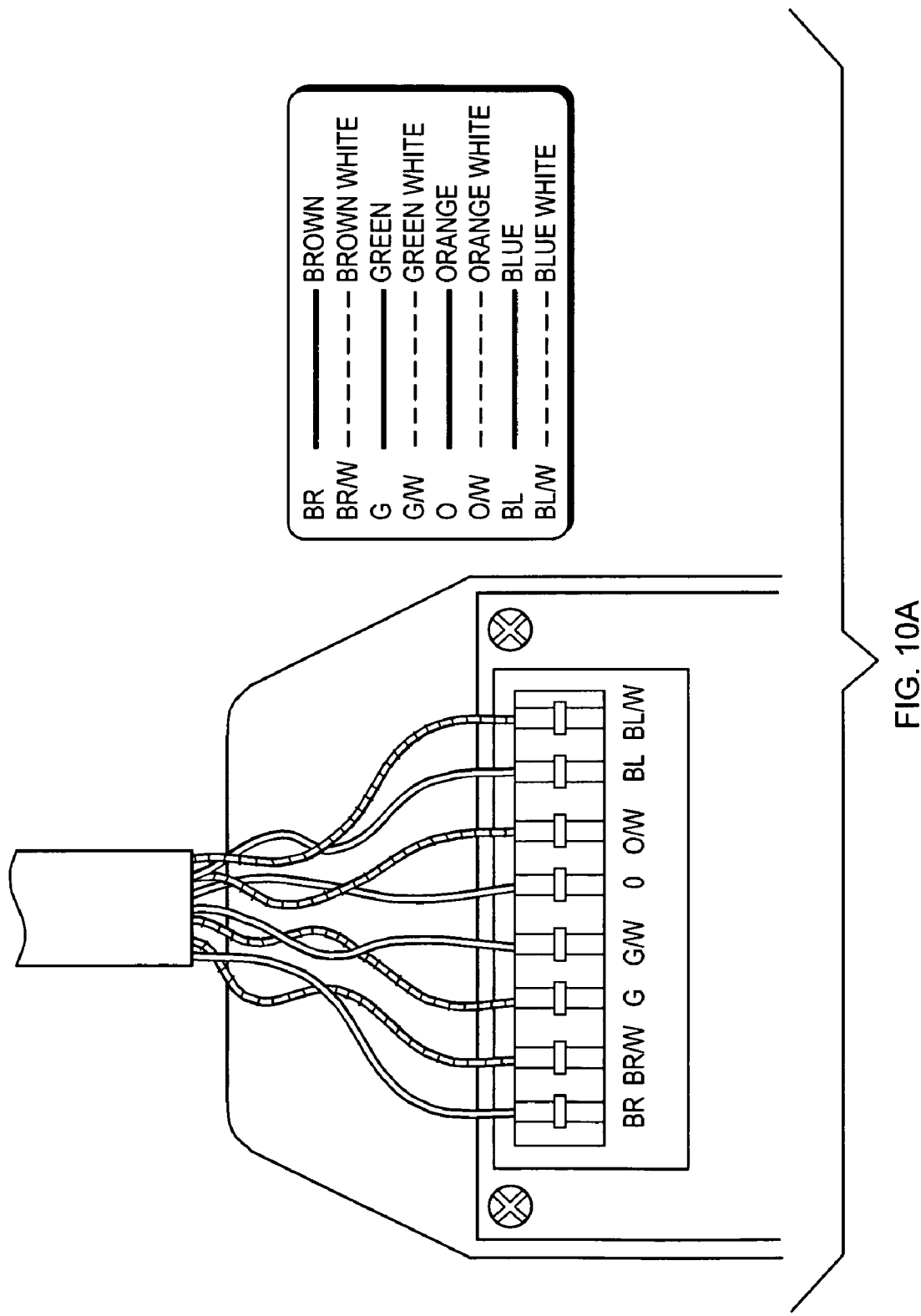
FIG. 10A illustrates a punch-down connection used with CAT5 cable.

The keypad provides a 110 punch-down connector for the CAT-5 cable. Use a punch-down tool to connect the wires according to the connector color code as shown in FIG. 10.

The keypad also has an 8-pole screw-terminal connector for accessing the internal speaker relay. The speakers connect to the output terminals. The input connectors are used for connecting an audio system amplifier when it shares the speakers with the keypad.

Note: Both speaker output channels must be connected, since they are wired in series. If you are using only one dedicated speaker, connect the speaker to one channel and connect a shorting jumper or a 2-watt power resistor of up to 8 ohms to the other channel. If the CAT-5 cable to the keypad is short, a jumper will suffice. If the CAT-5 is long, use a resistor instead to reduce the load on the keypad amplifier.

Figure 27:
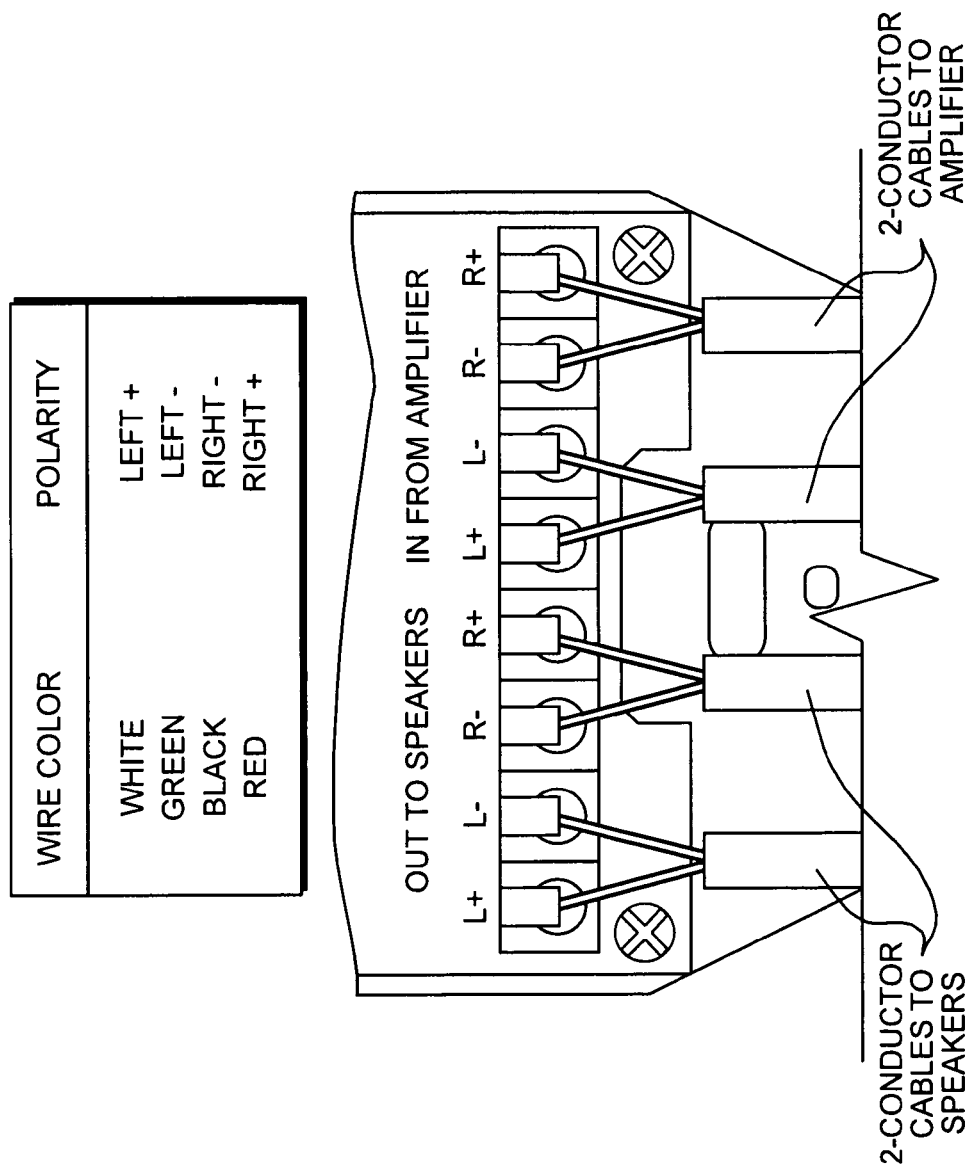
FIG. 27 illustrates speaker connections at a keypad unit.

Be sure to observe correct polarity when connecting the speaker wires for accessing the internal speaker relay. These are shown in FIG. 27 along with the standard color codes for speaker cables.

Backlight Color Selection

To select the keypad backlight color, use the miniature slide switch located on the bottom edge of the first circuit board behind the keypad yoke.

Certain keys change to red to indicate zone or door station selection, incoming page or intercom, door station call, or system busy. When another zone originates a page or intercom session, that zone is indicated by a red-backlit zone key on the ISK1.

3.2 ISK2 Advanced Keypad

The ISK2 Advanced Keypad 10B (FIG. 1B) has enhanced features to provide more user feedback and support a larger system than the ISK1. It uses a 5-character LCD panel to show zone and door station labels and other information.

One of the benefits of the Advanced Keypad is the ability to support systems as large as 36 zones, since the ISK2 is able to select any of the zones by label. The zone and door station labels are dynamically served from the hub and appear in alphabetical order on the keypad display.

A Page label is included in the list as the default selection when the system is inactive and the Talk key is pressed.

On the ISK2, the target zone for an intercom session is selected by scrolling through the zone list. Pressing and holding the Previous or Next key scrolls through the list with a half-second delay between zone labels.

A bar graph on the display indicates the zone volume level visually in conjunction with the audible ping tones. A small pushbutton on the front edge of the keypad is used to enter a setup mode to assign labels to the zones.

The ISK2 Advanced Keypad is a single-gang Decora®-style in-wall keypad for the ComPoint™ intercom system. Its LCD panel indicates system functions and displays assignable zone and door labels. The keypad has keys for selecting zones and door stations, setting volume, and enabling Do Not Disturb mode. It also has installer selectable amber or green backlighting.

The keypad uses one or two external speakers. A built-in speaker relay allows it to share speakers with an audio system for high-fidelity communications.

FIG. 1B illustrates user inputs on the ISK2 Keypad 10B.

DISPLAY 16—LCD panel shows zone and door station labels; also shows functions, modes, and volume TALK KEY 12—Activates microphone for outgoing communications NEXT 17 AND PREVIOUS KEYS 19—Scroll through lists on display; also activate door strike release module MICROPHONE 13—Picks up user's voice for communications and ambient sounds for Listen mode VOLUME KEYS 18—Control keypad output volume DND KEY 19—Enables and disables Do Not Disturb mode for the zone.

Installation and Trim

The ISK2 Keypad 10B is designed to install in a standard US electrical plastic wall box with an internal volume of at least 18 cubic inches (295 cm$^3$). The keypad occupies a single gang and accepts a Decora® wall plate. For the best accessibility, viewability, and microphone reception, we recommend installing the keypads at a standard thermostat height of 58 to 60 inches (1.5 m). This may vary according to personal preferences or requirements.

Wiring

ComPoint system components interconnect with CAT-5 cable. Run CAT-5 from the hub location to every keypad location. If the ComPoint system is sharing speakers with an audio system, loop the speaker cables through the keypad locations. If dedicated speakers are being used, run the speaker cables to the keypads. When running CAT-5 and speaker cables, avoid running them near AC power wiring. If you have to run the cables parallel to electrical wiring, space the cables at least two feet (0.6 m) from the AC power lines.

Connections

The keypad provides a 110 punch-down connector for the CAT-5 cable. Use a punch-down tool to connect the wires according to the connector color code as shown in FIG. 10.

The keypad also has an 8-pole screw-terminal connector for accessing the internal speaker relay. The speakers connect to the output terminals. The input connectors are used for connecting an audio system amplifier when it shares the speakers with the keypad.

Note: Both speaker output channels must be connected, since they are wired in series. If you are using only one dedicated speaker, connect the speaker to one channel and connect a shorting jumper or a 2-watt power resistor of up to 8 ohms to the other channel. If the CAT-5 cable to the keypad is short, a jumper will suffice. If the CAT-5 is long, use a resistor instead to reduce the load on the keypad amplifier.

Be sure to observe correct polarity when connecting the speaker wires. The standard color code for 4-conductor speaker cable is as in FIG. 27.

Backlight Color Selection

To select the keypad backlight color, use the miniature slide switch located on the bottom edge of the second circuit board behind the keypad yoke.

System Programming

Use an ISK2 Keypad connected to the hub to assign zone and door station labels for the system. See the ComPoint system manual for programming instructions.

Operation

The ISK2 Keypad allows you to perform the following functions:
  System-wide paging
  Point-to-point intercom
  Call and reply to door station
  Door strike release
  Listen to another zone It also allows you to put the zone in Do Not Disturb mode to prevent communications and doorbell chimes from being heard in the room where it's installed.

Paging

To send a page, press and hold the Talk key and speak anytime Page appears in the keypad display. Release the key when you're done speaking.

If the display shows a zone label instead of Page, first use the Next or Previous key to select Page before you press the Talk key.

If the system is busy when you press the Talk key, the display indicates Busy and the Talk key blinks red for 7 seconds.

When you press the Talk key, all keypads sound a single ping tone to announce your message. They also indicate which zone you're sending from by showing your zone's label on their displays. The zone indication remains for 30 seconds after you release the Talk key.

The keypads sound a double ping when you release the Talk key. This lets others know they can reply to the page within 30 seconds.

To reply to a page from another zone within the 30-second limit, press and hold the Talk key and speak. Your reply will be heard only in the zone that sent the page. Paging is not allowed when there is a door station call, intercom session, or other page in progress. Also, a door station call takes precedence over a page and thus interrupts a page in progress.

Intercom

To talk with someone in another zone, first use the Next or Previous key to select that zone. When the desired zone label appears in the display, press and hold the Talk key and speak. Release the Talk key when you're done speaking.

If the system is busy when you try to start an intercom session, the display indicates Busy and the Talk key blinks red for 7 seconds.

If the selected zone is in Do Not Disturb mode, the display alternately shows the zone label and DND at 1-second intervals and the DND key blinks rapidly for 7 seconds.

When you press the Talk key on the sending keypad, the receiving keypad sounds a single ping and shows the sending zone's label on its display.

When you release the Talk key, both the sending and receiving keypads sound a single ping to signal the person receiving can reply hands free within 7 seconds.

After 7 seconds, the keypads sound a double ping to signal the end of the hands-free reply period. To reply to an intercom from another zone before the double ping, just speak. After the double ping, press and hold the Talk key while you speak. You can reply as long as the sending zone's label appears on the display. An intercom session is not allowed when there is a page, door station call, or other intercom session in progress. Also, a door station call takes precedence and thus interrupts an intercom session in progress.

Door Station Call

The door station call function gives you the convenience of answering the door from any keypad.

When a visitor rings the doorbell from a door station, all keypads indicate the calling door station for 15 seconds by showing the door station label on their displays.

To reply to a door station call within the 15 seconds, press and hold the Talk key on a keypad and speak. Release the Talk key when you're done speaking.

Please note that you must use the Talk key when replying to a door station call. For your privacy, ComPoint does not allow a hands-free reply to the door station. When you release the Talk key, the door station sounds a single ping to let the caller know they can answer your reply hands free within 7 seconds. After the 7 seconds, the door station pings twice to indicate the end of the communication.

After 15 seconds, you can reconnect by using the Next or Previous key to select the door station and then pressing the Talk key to start a new intercom session. This does not ring the doorbell.

Door Strike Release

If your ComPoint system includes an optional ISDR1 Door Strike Release Module, you can activate it from a keypad to unlock the door.

To activate the Door Strike Release Module during a door station call, press and hold both the Next and Previous keys simultaneously for 3 seconds. The module then activates and the keypad confirms activation with an audible buzz tone through the speakers.

To activate the Door Strike Release Module when there is no door station call in progress, first use the Next or Previous key to select the door station, then press and hold both keys for 3 seconds.

Listen to Another Zone

You can use your ComPoint system to continuously listen to any single zone from one or more other zones. This is done by first turning on a keypad microphone in the zone you want to listen to, then selecting that zone on one or more other keypads.

To turn on a keypad's microphone, use the Next or Previous key to select that keypad's own zone label. The Talk key lights up red and after 2 seconds the display shows MicOn to show the keypad microphone is active. To listen to the zone with the active microphone from other keypads, use the Next or Previous key to select that zone on the other keypads. Each display alternately shows the zone label and Listn to indicate the system is in Listen mode.

To exit Listen mode, press any key other than Volume Up or Volume Down in the zone you're listening to. Listen mode cannot be disabled from any other zone. Other communication events have priority over Listen mode and thus interrupt listening to another zone.

Do Not Disturb mode

You can prevent pages, intercom sessions, door station calls, and doorbell chimes from being heard in any zone by using Do Not Disturb (DND) mode.

To turn on DND mode, press and release the DND key.

The DND key lights up red to indicate DND mode is on. To cancel DND mode, press any key other than Volume Up or Volume Down. The red DND light shuts off.

Combined Listen and DND Modes

You can use DND mode in a zone you are listening to. This way the zone you're listening to won't be disturbed by the doorbell or communication events. To set up a zone for listening and DND, first select that zone's label on its keypad. Then press and release the DND key.

The Talk key and DND key light up red and the display shows Listn to indicate the keypad's microphone is on and the zone is also in DND mode.

Volume Adjustment

To adjust the output volume of the keypad, press either the Volume Up or Volume Down key. This affects the volume of all communications heard in that zone, and depending on how the system hub is configured, may also affect the doorbell volume in the zone. A bar graph at the bottom of the keypad display shows the current volume setting.

The Volume Up and Volume Down keys do not affect the volume of the multiroom audio program in the zone.

ISK3 Door Station

Unlike the Basic and Advanced Keypads, the ISK3 Door Station 20 (FIG. 2) has only one key and contains an internal speaker. Amplification for the speaker is built in as with the keypads but there is no speaker interrupt relay. A potentiometer allows adjustment of the speaker volume level. The ISK3 also provides contacts for closing a standard doorbell circuit. These close for a minimum of 4 seconds to activate an existing doorbell or other device.

The ISK3 Door Station is a flush-mounted weatherproof call station for the ComPoint™ intercom system. It features an amber-backlighted Call key and a solid metal cover plate available in three finish options. The Door Station includes an internal microphone with automatic gain control along with a built-in amplifier and speaker for reliable, high-quality two-way communication with ComPoint keypads inside the house.

The device fits a single-gang deep wall box and features doorbell contacts and an installer-adjustable control for the speaker volume level. The ISK3 is environmentally tested for resistance to salt water spray and ultraviolet light. As shown in FIG. 2 it has MICROPHONE AND SPEAKER 21—Support two-way communication with interior keypads CALL KEY 22—Rings doorbell and initiates communication WEATHERPROOF COVER PLATE 23—Protects internal circuits and components Connections When running CAT-5 and control cables, avoid running them near AC power wiring as much as possible. If you have to run the cables parallel to electrical wiring, space the cables at least two feet (0.6 m) from the AC power lines.

The door station provides a 110 punch-down connector for the CAT-5 cable. Use a punch-down tool to connect the wires according to the connector color code as shown in FIG. 10.

To connect a separate doorbell system, connect the 2-conductor cable to the doorbell terminals on the back of the door station. The terminals provide access to normally open switch contacts that close for a minimum of 4 seconds when the Call key is pressed. Connect the cable from the ISK3 to the doorbell according to the doorbell system instructions.

Figure 28:
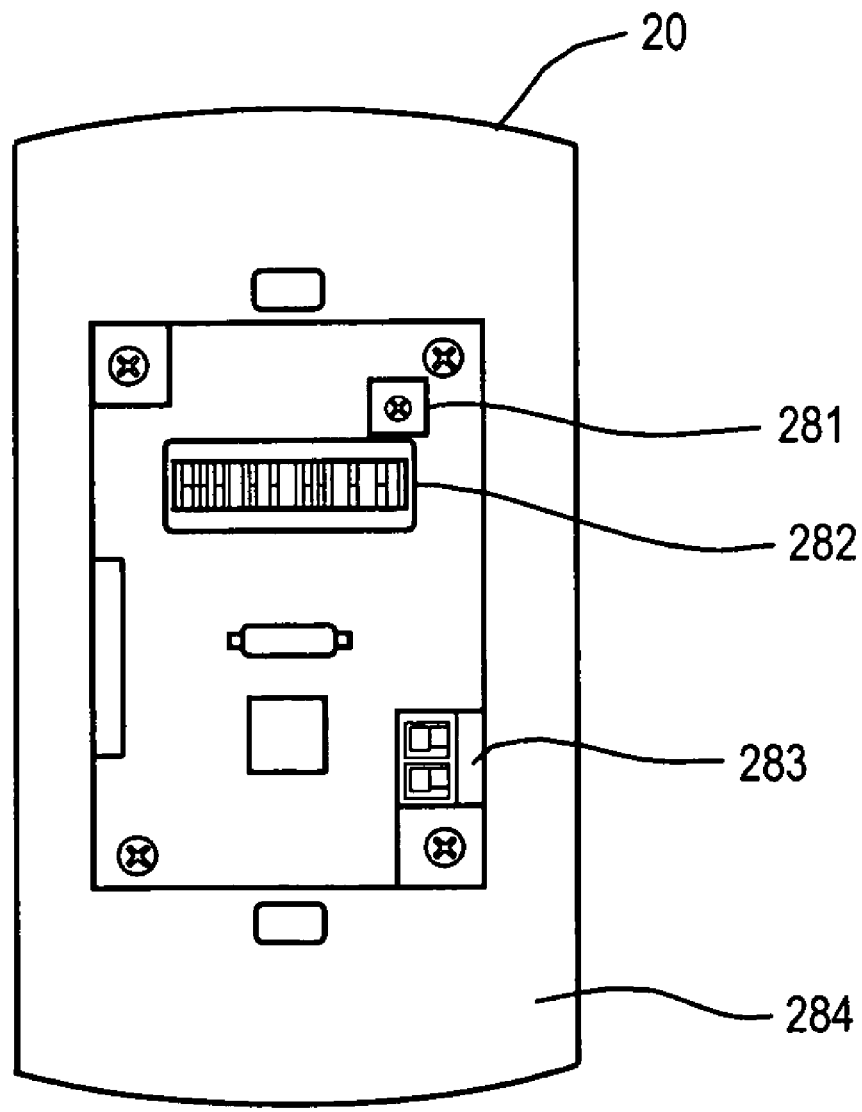
FIG. 28 is a rear view of an ISK3 unit.
Figure 29:
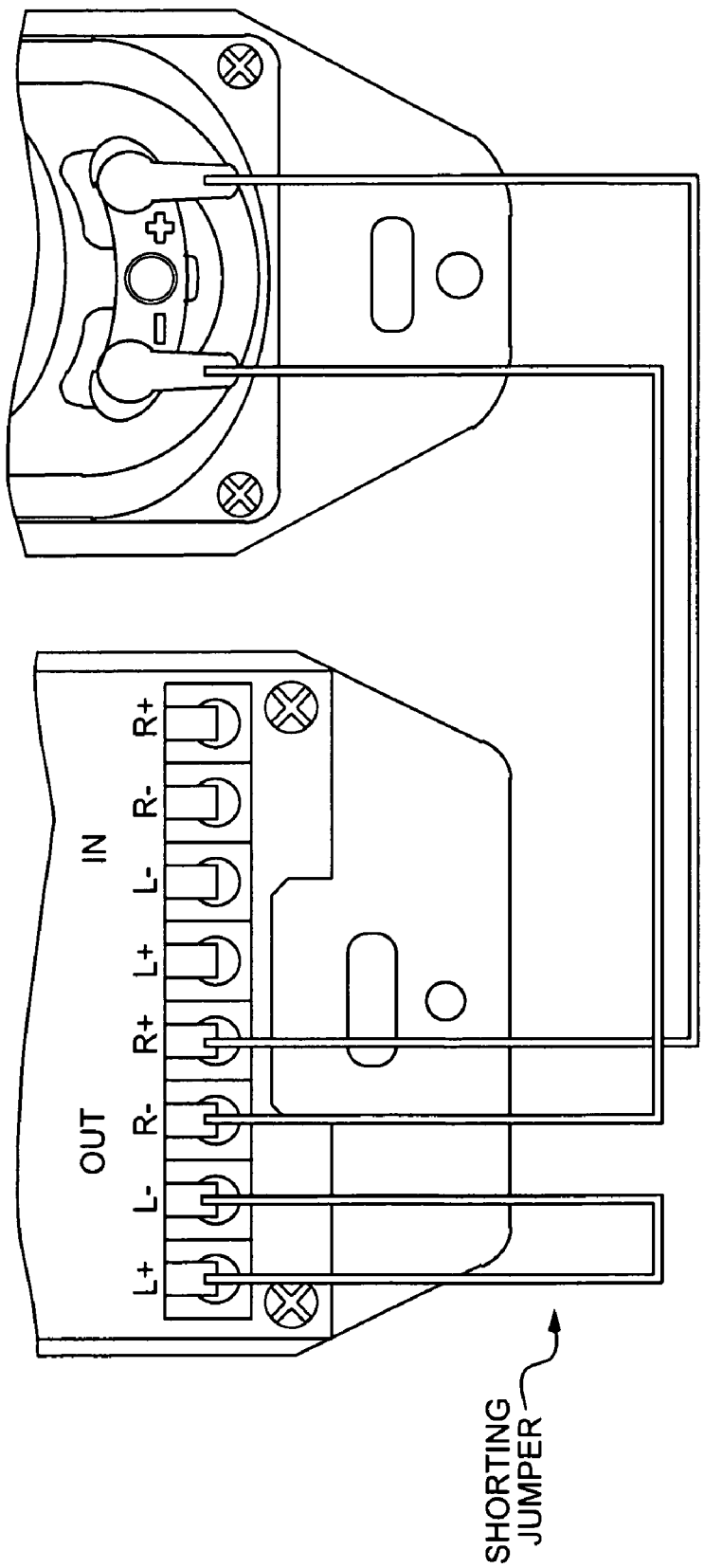
FIG. 29 illustrates how a monaural auxiliary speaker is connected.

FIG. 28 is a rear view of the ISK3 Door Station showing the following elements:

POTENTIOMETER 281—Adjusts speaker volume

110 PUNCH-DOWN BLOCK 282—For CAT-5 connection

SCREW TERMINALS 283—For external doorbell connection

WEATHERPROOF GASKET 284—Seals out moisture

Installation and Trim

The ISK3 Door Station installs in a standard single-gang US electrical deep plastic wall box with an internal volume of at least 22 cubic inches (360 cm3). With its own gasketed weather-resistant front plate, it needs no other protection.

Wiring

ComPoint system components interconnect with CAT-5 cable. Run CAT-5 from the hub location to each door station location. If you are installing optional ISDR1 Door Strike Release Modules, loop the door station cables through the module locations.

To use a separate doorbell system instead of the doorbell built into the ComPoint system, run 2-conductor cable from each door station to the doorbell system.

Speaker Volume Adjustment

Use the potentiometer to adjust the speaker volume. Turn it clockwise to raise the volume or counterclockwise to lower it. This does not affect the microphone sensitivity.

Operation

Press and release the Call key to ring the doorbell. When a person inside replies from a keypad, you will hear a single beep when they begin the reply and again when they're done speaking. You then can answer the reply within 7 seconds by just speaking. At the end of the 7 seconds, you will hear a double beep, after which you can no longer answer the reply.

Note: Pressing and releasing the Call key always rings the doorbell. To answer a reply, just speak without pressing the Call key.

You will hear a buzz tone from the door station when the person inside activates the door strike release.

ISDR1 Door Strike Release Module

The optional ISDR1 Door Strike Release Module 40 (FIG. 4) provides relay contacts for activating a door strike release from another manufacturer. The module connects in the CAT-5 line 60 between an ISH1 hub 30 and an ISK3 door station 20. See FIG. 9 for a typical connection. The ISDR1 can be located anywhere in the CAT-5 line, though it would be preferable to have it close to the door. The ISDR1 obtains its operational power from the hub. The separate door strike release must receive voltage from its own power source. The ISDR1 passes signals on all leads of the CAT-5 cable except one which is used to activate the module from the hub upon receiving a command from a keypad.

By providing a normally closed (NC) relay contact in addition to the normally open (NO) and common contacts used for the door strike release activation, the ISDR1 can be used for other applications where a versatile relay is needed. The ISDR1 can be activated by providing 15 VDC between two of the eight positions in the 110 punch-down input connector.

The ISDR1 Door Strike Release Module allows a user to open a door or gate from any ComPoint keypad. The module connects in the CAT-5 line between the ISH1 hub and an ISK3 door station and provides relay contacts for activating a separate door strike release or gate actuator. By providing both normally open and normally closed relay contacts, the ISDR1 can be used for other applications where a versatile relay is needed for control from a ComPoint keypad.

The ISDR1 is designed for surface mounting. To facilitate connection to a door strike release unit, it should be located in an accessible area near the door, such as an attic, basement, or closet space between the door station and the hub.

Figure 4:
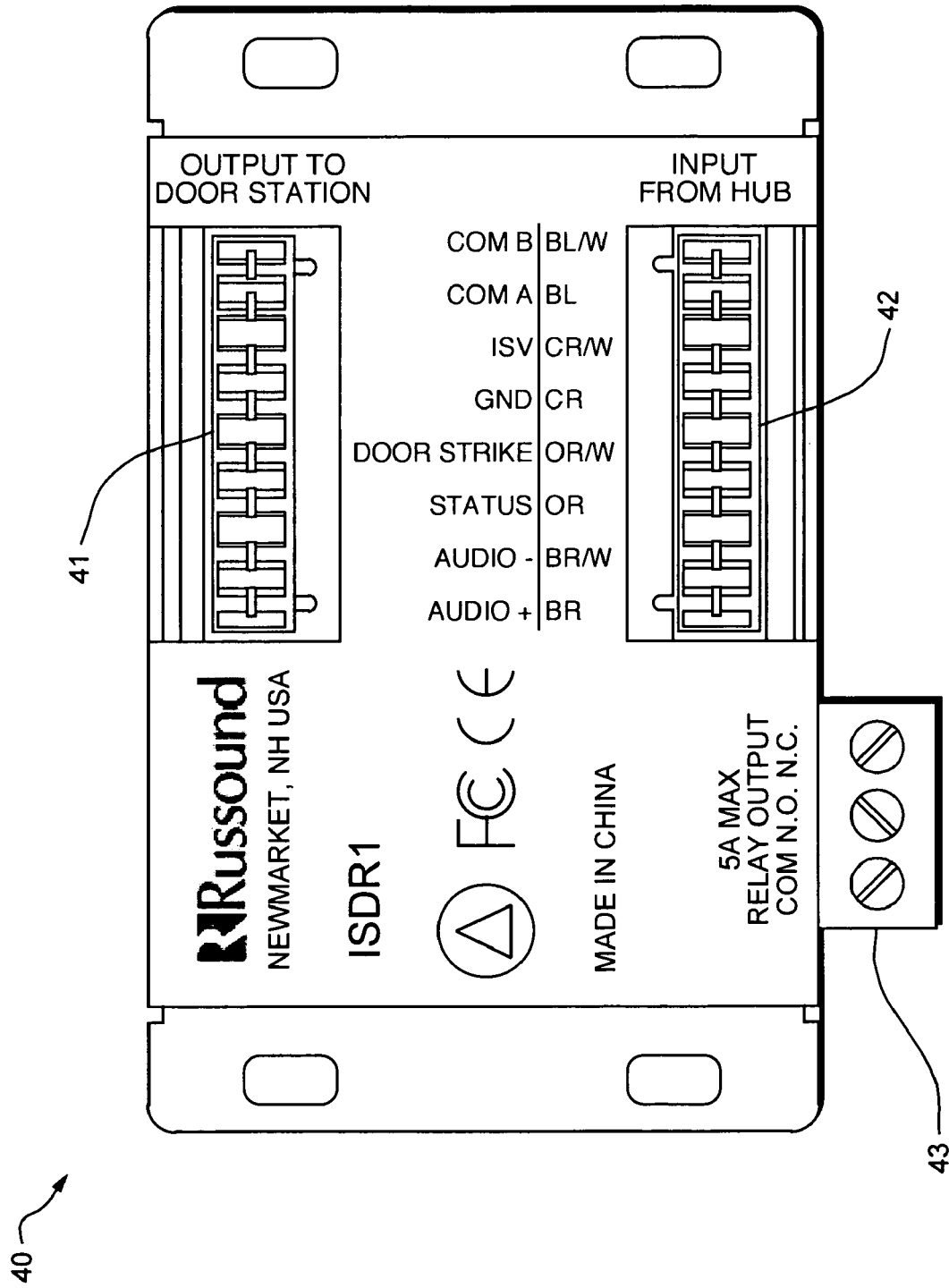
FIG. 4 is a rear view of an ISDR1 door strike release module.

Shown in FIG. 4 are the following connections to an ISDR1:

INPUT AND OUTPUT CONNECTORS 41 and 42—A pair of 110 punch-down connectors for CAT-5 cables from door station and hub RELAY OUTPUT CONNECTOR 43—Removable screw terminal connector for door strike release, gate actuator, or other device.

Installation

The ISDR1 Door Strike Release Module mounts on any flat surface. Generally, if the module is used to activate a door strike release, install it in an accessible location close to the door, such as an attic, basement, or closet space. If the module is used with a central security controller, locate it near the controller or the ComPoint hub.

The ISDR1 can be located up to 250 feet (76 m) from the hub. The cable distance between the ISDR1 and the separate door strike release or gate actuator is determined by the release or actuator manufacturer.

Wiring

ComPoint system components interconnect with CAT-5 cable. When running the door station CAT-5 cables, loop them through the ISDR1 module locations.

For the connection with the separate door strike release or other device, run two-conductor control cable between the ISDR1 and the device being controlled.

When running CAT-5 and control cables, avoid running them near AC power wiring. If you have to run the cables parallel to electrical wiring, space the cables at least 2 feet (0.6 m) from the AC power lines.

Connections

The ISDR1 provides 110 punch-down connectors for the CAT-5 cables. Use a punch-down tool to connect the wires according to the color code shown on the module.

The relay output terminals provide access to normally open (NO) and normally closed (NC) contacts. Typically a door strike release connects between the COM and NO terminals. The NC terminal is available to provide an interruptible signal path for other applications.

Operation

The ISDR1 obtains its operational power from the ComPoint hub. It passes signals to and from the door station on all leads of the CAT-5 cable except one, which is used to activate the module from the hub upon receiving a command from a keypad. When activated this way, the ISDR1's relay remains active for 3 seconds.

The ISDR1 can also be activated by providing 15 VDC between the orange/white (+) and green/white (−) terminals in the input connector.

Note: The ISDR1 does not power the separate door strike release or gate actuator. Any external device connected to the ISDR1 must receive power from its own source.

6. Keypad Backlight Color Selection

Each ComPoint keypad can be set to either amber or green backlighting, selected by a miniature slide switch on the bottom edge of one of the circuit boards. Select the desired backlight color before installing the keypads.

7. Device Installation and Trim

The ISH1 hub 30 is designed for surface mounting or installation in a structured wiring panel. It should be located near an electrical outlet. The ISK1 10A and ISK2 10B Keypads are designed to install in standard US electrical plastic wall boxes with an internal volume of at least 18 cubic inches (295 cm$^3$). Each keypad occupies a single gang and accepts a Decora® wall plate (Decora is a trademark of Leviton Manufacturing Co., Inc., of Little Neck, N.Y.). For the best accessibility, viewability, and microphone reception, we recommend installing the keypads at a standard thermostat height of 58 to 60 inches (1.5 m). This may vary according to personal preferences or requirements.

The ISK3 Door Station 20 installs in a standard single-gang US electrical deep plastic wall box with an internal volume of at least 22 cubic inches (360 cm$^3$). It has its own weather-resistant front plate and thus needs no other cover plate. The ISDR1 Door Strike Release Module 40 is a surface-mount device. It should be located in an accessible area near the door, such as an attic, basement, or closet space between the door station and the hub. The ISDR1 connects to a door strike release unit, which in most cases would be installed by a security contractor.

System Wiring and Connections

ComPoint system components connect with CAT-5 cable. Run CAT-5 from the hub location to every keypad and door station location. If you are installing ISDR1 modules, loop the door station cables through the module locations. Each keypad in the system requires one or two external speakers. If the ComPoint system is sharing speakers with an audio system, loop the speaker cables through the keypad locations.

If dedicated speakers are being used, run the speaker cables to the keypads.

When running CAT-5 and speaker cables, avoid running them near AC power wiring. If you must run the cables parallel to electrical wiring, space the cables at least 12 inches (30 cm) from the AC power lines.

The keypads, door stations, and door strike release modules have 110 punch-down connectors for the CAT-5 cables. Connect the wires with a punch-down tool as shown in FIG. 10. The keypad wire functions are as follows:

Installation

Speaker Connections

Figures 10B, 11:
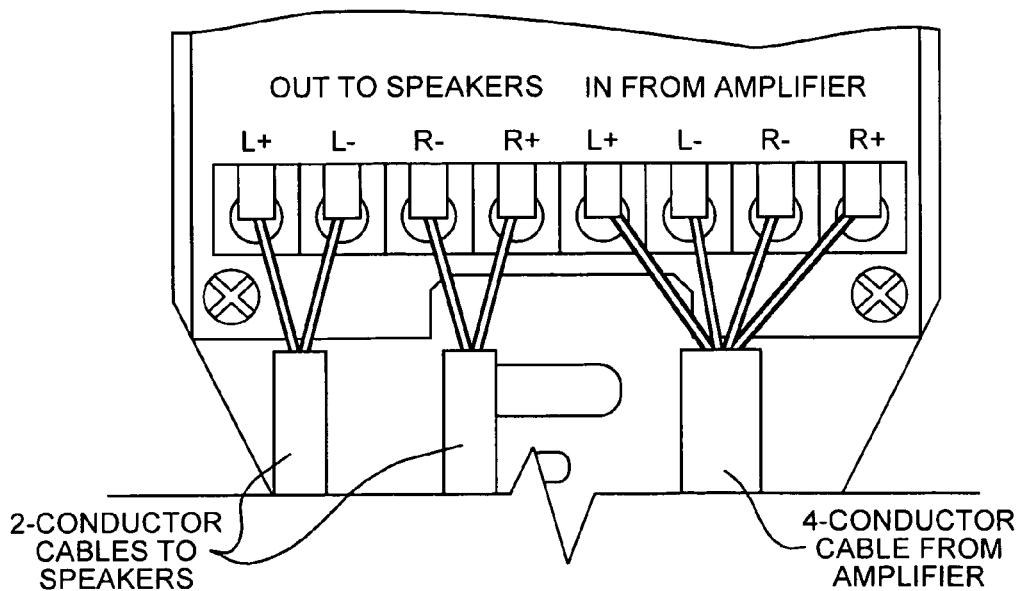
FIG. 10B is a table illustrating CAT5 cable wire functions.
FIG. 11 illustrates a multi-room speaker connection to a keypad unit.

Each keypad has an 8-pole screw-terminal connector for accessing the internal speaker relay. An example is shown in FIG. 11. This connector is typically used for connecting the zone speakers in a multiroom audio system. In a zone where the ComPoint system does not share speakers with an audio system, connect a dedicated speaker or pair of speakers to the output terminals.

Note: Both speaker output channels must be connected, since they are wired in series. If you are using a single dedicated 8-ohm speaker such as the ISSP ComPoint Speaker, connect the speaker to one channel and a shorting jumper to the other channel. If you are using a single 4-ohm speaker, connect it to one channel and a 4-ohm, 2-watt power resistor to the other channel.

Be sure to observe polarity when connecting the speaker wires. The standard color code for 4-conductor speaker cable is shown in the chart of FIG. 11.

Hub Modular Connections

The hub 30 has 8-pole modular jacks for keypad and door station connections. The keypads connect to ports 1 through 6, and the door stations connect to DOOR1 and DOOR2. These connections are made with an RJ-45 connector according to the T568A standard as in FIG. 12.

The hub 30 also uses modular jacks for the link ports. You may use any 8-pole straight-through RJ-45 patch cable to link multiple hubs 30 together.

Doorbell Connections

Figure 13:
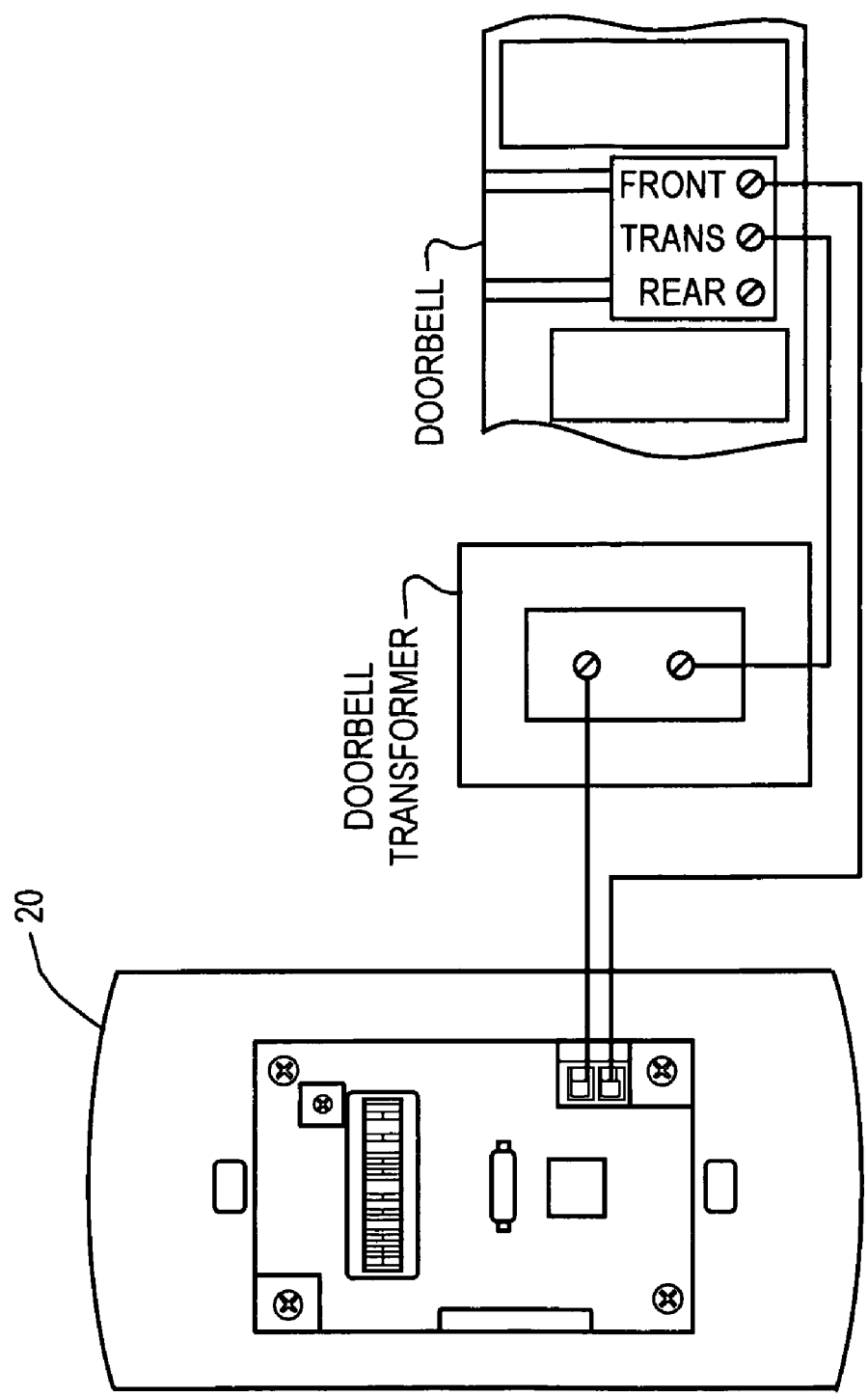
FIG. 13 illustrates one typical way of connecting a doorbell to the rear of a door station.

ComPoint can operate a separate doorbell system as well as provide doorbell chime tones in the zones. To use a separate doorbell, connect each door station ISK3 to the doorbell as shown in FIG. 13 or in the doorbell system instructions.

Door Strike Release Connections

Figure 14:
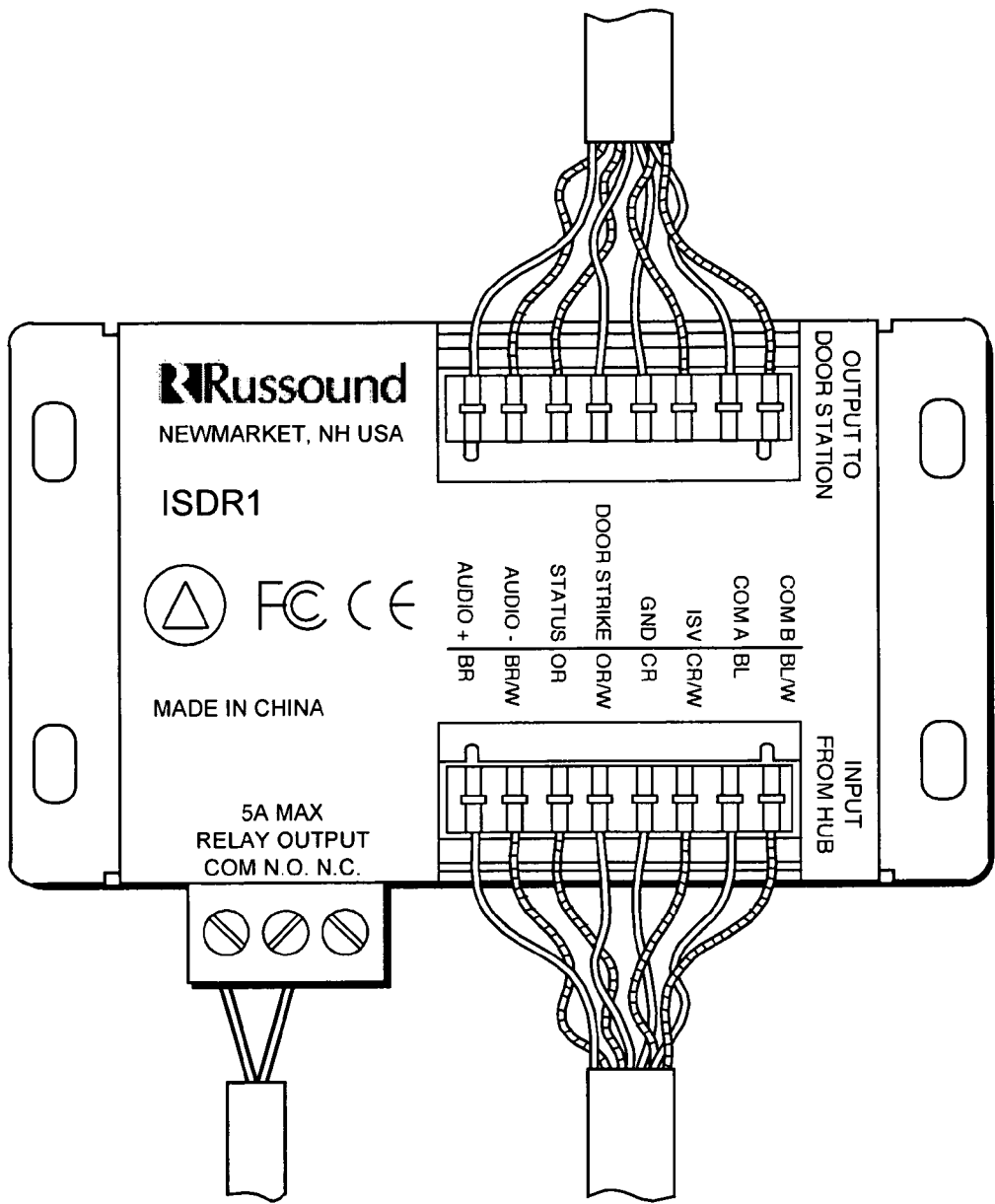
FIG. 14 illustrates a door strike release module connection in more detail.

The door strike release module has 110 punchdown connectors (as shown in FIG. 14) for the hub and door station cables. It also has screw terminals for its relay contacts that accept up to 14 AWG stranded wire.

Power Connection

After making all other connections and setting the hub ID numbers (see next section), plug an ISPS power supply 60 into the power input jack on each ISH1 hub 30. See FIG. 9.

Upon powering up, the hub(s) register all the connected keypads and door stations for proper communications routing. Wait 15 seconds for registration to complete before operating the system. If a keypad or door station is connected or hubs are linked while the system is powered up, you will need to cycle power to the hub(s).

D. System Programming

Overview

All system feature programming resides in the ISH1 hub 30. For a six-zone system with ISK1 Basic Keypads 10A, programming consists only of setting the doorbell chimes. For a system with ISK2 Advanced Keypads 10B, programming includes assigning zone and door station labels. For a system with more than six zones, programming includes setting hub ID numbers.

Figure 15:
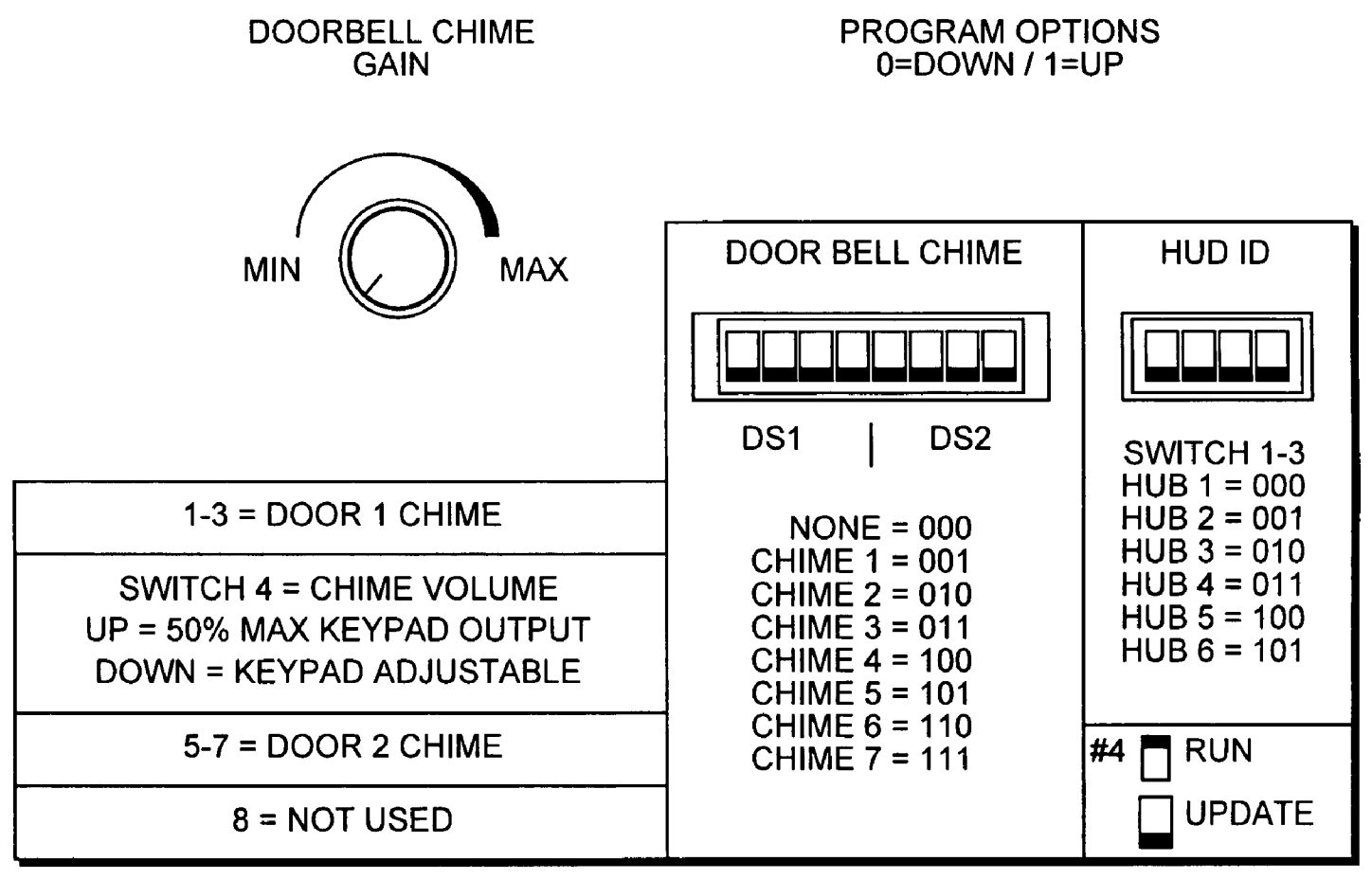

As shown in FIG. 15, the ISH1 hub 30 has DIP switches, for setting the doorbell chime and hub ID number assignments. The hub's firmware includes zone and door station labels for display on the ISK2 Advanced Keypads 10B. These labels are assigned by using a connected ISK2 keypad.

With multiple hub 30, the label settings are initially stored in the hub to which the keypad is connected. Upon exiting the programming procedure, the settings are copied to the other hubs.

Hub 1 serves as the master hub for storing all zone and door label settings. Whenever hub 1 is powered up, its settings are copied to the other hubs. Accordingly, hub 1 should be powered up last whenever the system power is cycled.

Doorbell Chimes

A single 8-switch DIP, also shown in FIG. 15, assigns doorbell chimes for both door stations. Switches 1 through 3 select the chime for door 1 and switches 5 through 7 select the chime for door 2. There are 7 chime options as well as a setting for no chime when a separate doorbell system is used. To select the chimes, set the switches as shown in the table of FIG. 16.

Switch 4 selects how the chime volume level is managed. Setting the switch to 1 (up) sets the chime volume level to a fixed level at 50% of the maximum keypad output in all zones. This causes the chime to play at the same level in all zones. Setting the switch to 0 (down) allows the chime volume to be determined by the keypad volume level setting in each zone independently. Switch 8 is currently not used.

The ISH1 hub 30 also has a gain control for setting the overall volume of the doorbell chime through the system. This can be used to adjust the chime level relative to the communication level. Note: In a system with multiple linked hubs, only the settings on hub 1 affect the doorbell chime assignments and volume level, since the door stations connect only to hub 1. Because the settings take effect immediately, the doorbell chimes can be set at any time. There is no need to cycle the power after setting them.

Hub ID Numbers

In any ComPoint system, there must be a hub with ID number 1. In a multiple-hub system, each hub's ID number must be unique. On each hub the ID number is manually assigned on the 4-switch HUB ID DIP before the system is powered up. To assign the ID number, set switches 1 through 3 as shown in the table of FIG. 17.

Switch 4 enables a programming mode for updating the system firmware. Leave this switch in the up position for system operation.

Zone and Door Station Labels for Advanced Keypads

The ISK2 Advanced Keypad shows which zone or door station is selected by displaying a zone or door station label. The default zone labels are Zn#1 through Zn#36, based on the hub and port numbers the keypads are connected to. The default door station labels are Door 1 and Door2. You can assign zone labels from the table in FIG. 18 and door station labels from the table in FIG. 19 to replace the default labels. The hubs retain label assignments in nonvolatile memory so they won't be affected if the system loses power.

To assign labels you must have all hubs linked together with unique ID numbers (if the system has multiple hubs) and an ISK2 Advanced Keypad connected to any hub. You can use the same keypad to assign labels for the entire system. The system must be powered up to assign labels.

Assigning Zone Labels

Figure 20:
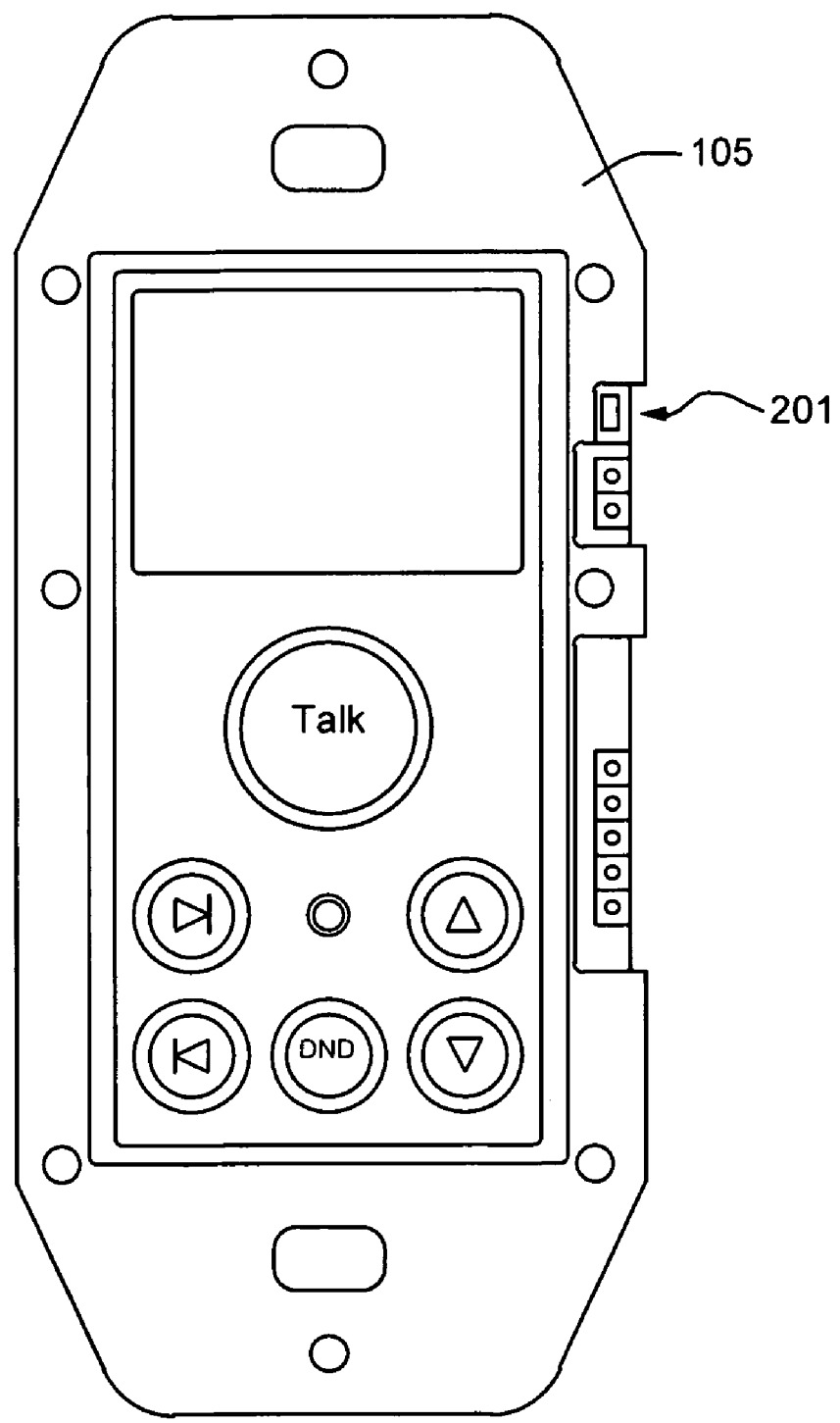
FIG. 20 illustrates the location of the ISK2 setup button.
Figure 22:
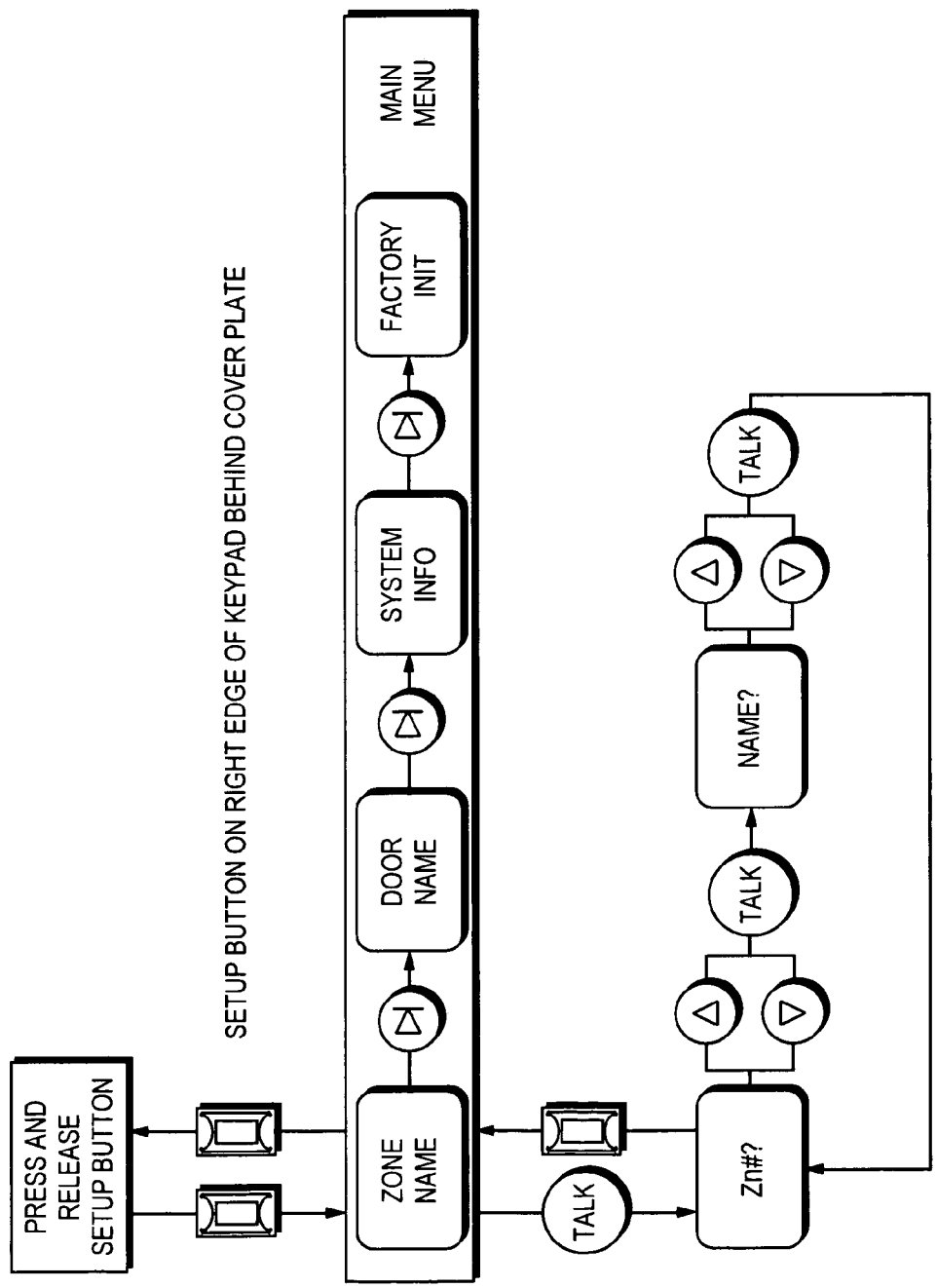
FIG. 22 is an ISK2 keypad zone name procedure.

To assign zone labels, follow these steps (or the ISK2 Keypad Zone Name Procedure flow chart of FIG. 22):

1. Remove the wall plate if its installed. Press and release the Setup button 201 on the right edge of the keypad to enter the main menu as in FIG. 20. The display shows ZName (ZONE NAME).

2. Press the Talk key to enter the Zone Name procedure.

The display shows Zn#? to prompt you to select a zone number.

3. Press the Talk key again for the next sequential zone to be assigned or use the Volume Up or Volume Down key to select a specific zone. You can press and hold the key to scroll through the list of zones with a half-second delay between items. Stop at the desired zone number.

4. Press and release the Talk key. The display shows Name? to prompt you to assign a zone label.

5. Use the Volume Up or Volume Down key to select a label from the list of zone labels. You can press and hold the key to scroll through the list of zone labels with a half-second delay between items. Stop at the desired label.

6. Press and release the Talk key to save the selection.

The display shows Zn#? to prompt you to select the next zone.

7. Repeat steps 3 through 6 for the remaining zones.

Press and release the Setup button to exit the procedure. You can then go to the Door Name Procedure by pressing the Next key or press the Setup button again to exit the main menu. Note: If you aren't sure which zone an ISK2 keypad is connected to, observe the keypad's display when powering up the system. When a hub is powered up, each keypad connected to that hub briefly indicates Page, then the port and hub number to which it is connected. For example, an indication of P4:H2 shows the keypad is connected to port 4 on hub 2. This indication remains for 3 seconds, then reverts to Page.

Zones are numbered sequentially starting with hub 1, port 1. The table in FIG. 21 shows zone numbers and port assignments.

Assigning Door Station Labels

Figure 23:
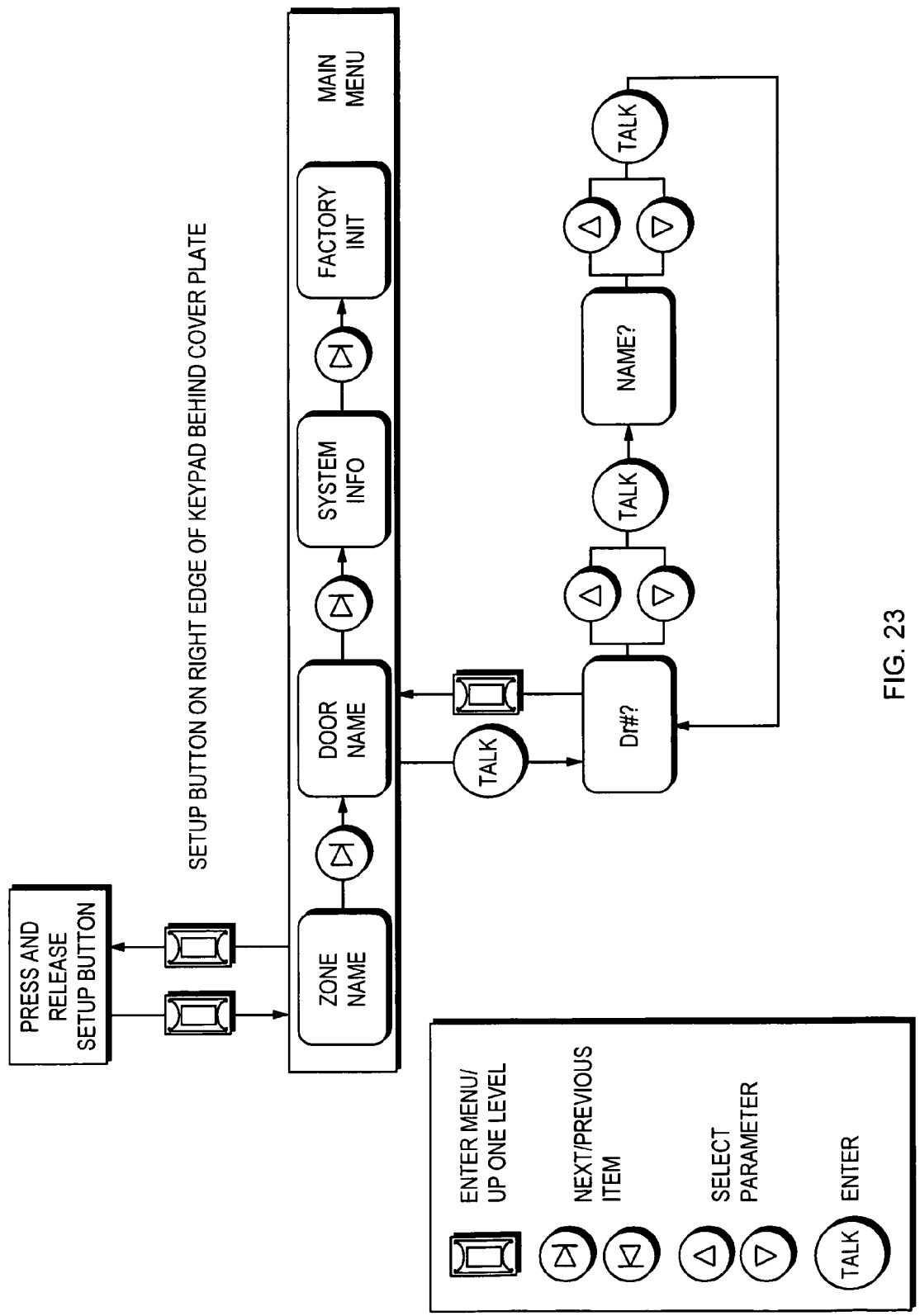
FIG. 23 is an ISK2 keypad door name procedure.

To assign labels to the door stations, follow these steps (or the ISK2 Keypad Door Name Procedure flow chart in FIG. 23):

1. Press and release the Setup button on the right edge of the keypad to enter the main menu. The display shows ZName (ZONE NAME).
2. Press and release the Next key once. The display shows DName (DOOR NAME).
3. Press the Talk key to enter the Door Name procedure.

The display shows Dr#? to prompt you to select a door station number.

4. Press the Volume Up or Volume Down key to select a door station.
5. Press and release the Talk key. The display shows Name? to prompt you for a door station label.
6. Use the Volume Up or Volume Down key to select a label from the list of door station labels. You can press and hold the key to scroll through the list of zone labels with a half-second delay between items. Stop at the desired label.
7. Press and release the Talk key to save the selection.

The display shows Dr#? to prompt you to select the other door station.

8. To assign a label to the other door station, repeat steps 4 through 7.

Press and release the Setup button once to exit the procedure or twice to exit the main menu. Once you have assigned the hub ID numbers (for systems with multiple hubs), doorbell chimes, zone labels, and door station labels, the system is fully programmed.

Viewing System Information

Figure 24:
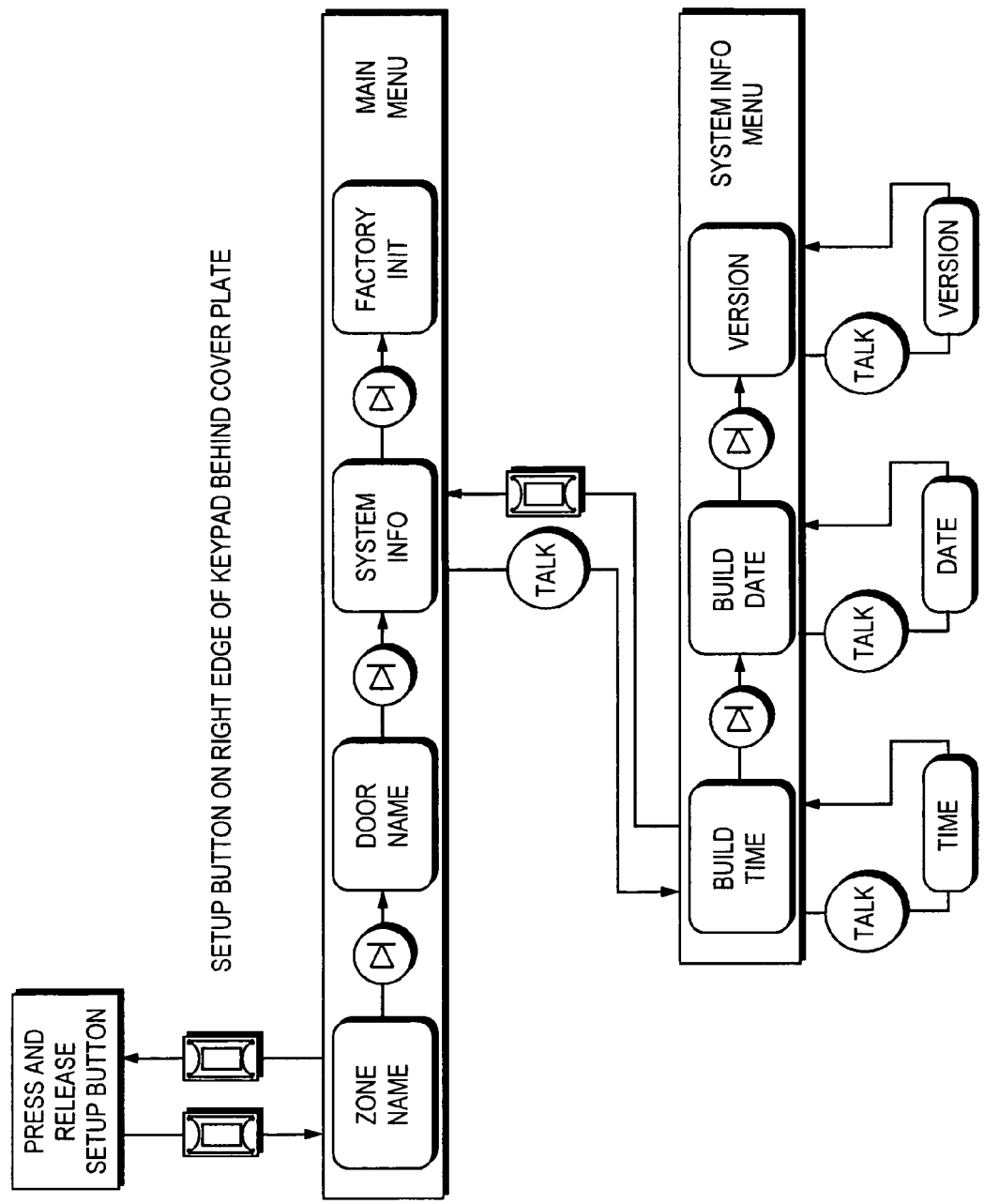
FIG. 24 is a system info menu procedure.

The System Info Menu allows you to check the build time, build date, and version of the hub's firmware. This is useful to see whether the hub has the latest firmware version. To view system information, follow these steps (or the System Info Menu flow chart in FIG. 24):

1. Press and release the Setup button on the right edge of the keypad to enter the main menu. The display shows ZName (ZONE NAME).
2. Press and release the Next or Previous key twice.
They display shows SInfo (SYSTEM INFO).
3. Press the Talk key to enter the System Info menu.
The display shows BTime (BUILD TIME).
4. Press and release the Talk key to view the build time, or
5. Press the Next key to go to BDate (BUILD DATE).
6. Press and release the Talk key to view the build date, or
7. Press the Next key to go to Ver (VERSION).
8. Press and release the Talk key to view the version.

Press and release the Setup button once to exit the procedure or twice to exit the main menu.

Restoring Factory Settings

The Factory Initialization Procedure resets the zone and door station label assignments and zone volume settings to the original factory defaults. This procedure affects the hub to which the keypad is connected, and initializing hub 1 also resets the entire system.

Figure 25:
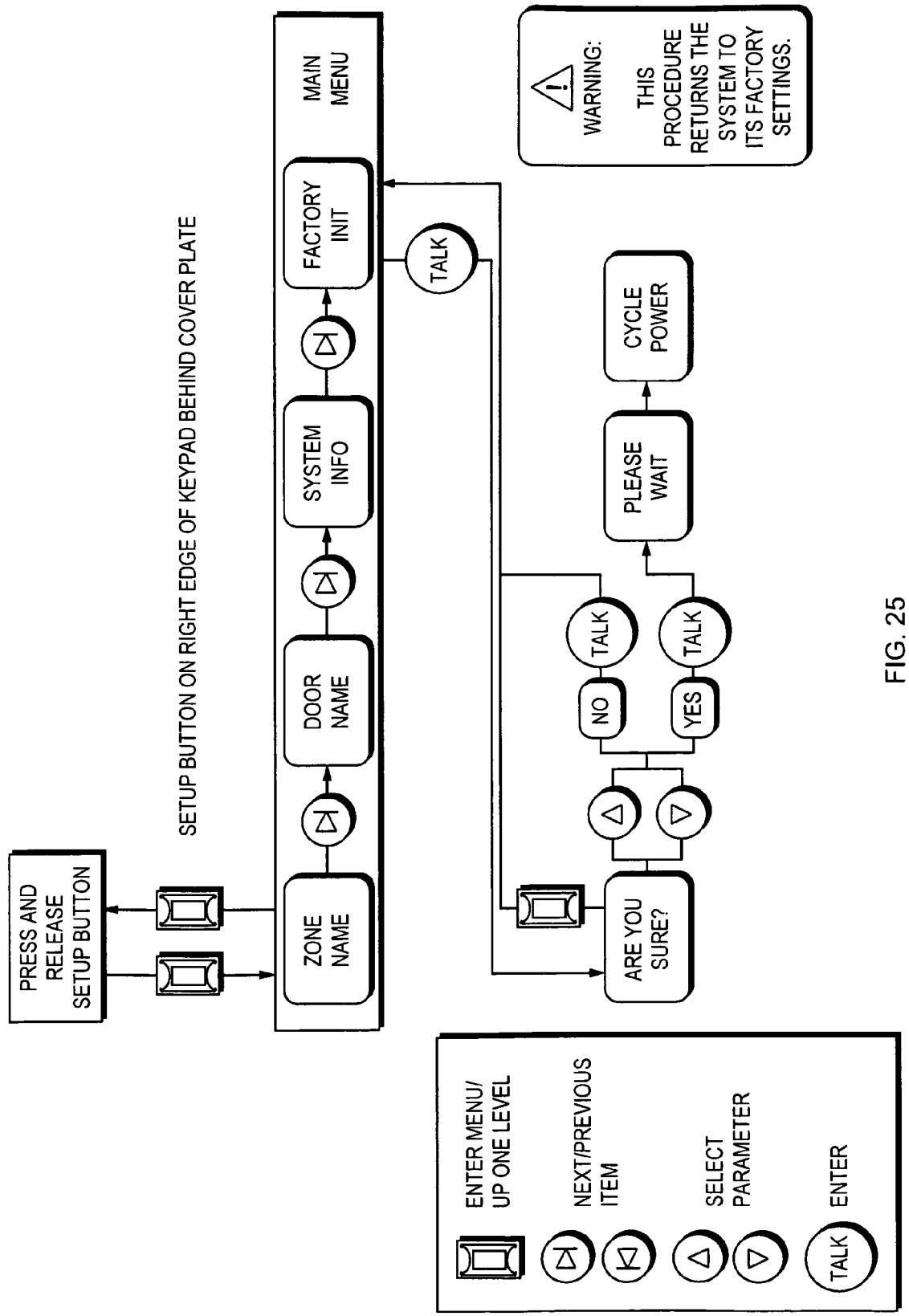
FIG. 25 is a factory initialization procedure.

To restore the factory settings, follow these steps (or the Factory Initialization Procedure flow chart in FIG. 25):

1. Press and release the Setup button on the right edge of the keypad to enter the main menu. The display shows ZName (ZONE NAME).
2. Press and release the Next key three times or the Previous key once. The display shows FInit (FACTORY INIT).
3. Press the Talk key to enter the Factory Initialization Procedure. The display shows Sure? (ARE YOU SURE?).
4. Press the Volume Up or Volume Down key to select Yes.
5. Press the Talk key to initialize the system. The display shows Please Wait, followed by Cycle Power.
6. Cycle the power on the hub to which the keypad is connected.

E. System Functions

Introduction

It should be understood that these system functions are implemented in software or firmware running in microcontrollers in the hub (ISH1). Corresponding keypads (ISK1, ISK2), door station (ISK3), and door strike release module (ISDR1) transmit messages in response to keypad inputs or display information according to receive messages.

ComPoint routes communications by switching its audio bus to the keypads and door stations. All switching takes place in the hub(s). The hub switches the bus to either the microphone or the amplifier in a keypad or door station, depending on the direction of the communication.

For example, when you start an intercom session, the hub causes the bus to connect to the microphone in the sending keypad and the keypad amplifier in the selected receiving zone. For the reply, it reverses the connection so the microphone in the receiving keypad is connected to the amplifier in the sending keypad.

Communication Priority Levels

Certain communication events take priority over others for proper system operation. Each function has a priority level based on its application. If two identical levels of communication overlap, the first to occur has priority.

System functions have the priorities shown in FIG. 26. Thus, paging is not allowed when the audio bus is being used for an intercom session or a door station call. Similarly, an intercom session is not allowed when a door call or page is in progress. However, paging and intercom can interrupt Listen mode, and door station calls can interrupt all other communications. DND mode blocks all levels of communication to a zone in that mode.

Paging

Paging is the default system function. To send a page, all one needs to do is press and hold the Talk key and speak, as long as the keypad is not indicating a selected zone or door station. Since a page is a system-wide broadcast, no zone selection is necessary.

When a page is sent, the audio bus connects to the microphone in the sending zone and the amplifiers in all other zones that are not in DND mode. All keypads indicate which zone is sending the page for 30 seconds after the Talk key in the sending zone is released.

During this 30-second time frame, anyone in a receiving zone can reply to the page by holding in the Talk key and speaking. This switches the audio bus to the microphone in the receiving zone and the amplifier in the sending zone. The reply is heard only in the sending zone. With paging, pressing the Talk key causes a single ping tone to sound in the receiving zones to signal the beginning of the announcement. Releasing the Talk key sounds a double ping to signal the end of the announcement.

Zones in DND mode don't receive a page audio signal but do indicate the sending zone. Also, pages are never sent to door stations.

Intercom

Intercom is a point-to-point communication that involves only two zones, unlike a page which is system wide. For ease of use, the intercom function allows hands-free replies as well as manual replies with the Talk key.

The intercom function requires first selecting a target zone. This is done by pressing a zone key on the ISK1 Basic Keypad or scrolling to a zone label on the ISK2 Advanced Keypad. After selecting a zone, the user may press the Talk key to begin communication.

If an invalid zone (one that has no keypad) is selected on an ISK1 Basic Keypad, the zone key blinks rapidly for 7 seconds. Pressing another zone key selects another zone. After a valid target zone is selected, pressing the same zone key deselects it.

If a zone in DND mode is selected on an ISK1 Basic Keypad, the zone key and DND key blink rapidly for 7 seconds when the Talk key is pressed.

With the ISK2 Advanced Keypad, only valid zones (ones with keypads connected) appear in the zone list on the display. If a zone in DND mode is selected, the display alternately shows the zone label and DND at 1-second intervals and the DND key blinks rapidly for 7 seconds. A selected zone can be deselected by selecting Page or another zone.

When receiving an intercom message, the target keypad indicates the sending zone. This indication remains for a 37-second reply period after the Talk key on the sending keypad is released.

There are two ways to reply to an intercom message with either type of keypad: a handsfree reply within 7 seconds and using the Talk key within 30 seconds thereafter. When the Talk key on the sending keypad is released, both the sending and target keypads sound a single ping and the target keypad permits a hands-free reply by activating its microphone for 7 seconds. During this period the Talk key on the target keypad is lit red to indicate the microphone is active.

After the 7 seconds, a double ping in both the sending and target zones indicates the end of the hands-free reply period. A reply may still be made by pressing and holding the Talk key within the next 30 seconds. After the 30 seconds, a reply can no longer be made, but a person in the receiving zone can start a new intercom session to the original sender.

Each time a Talk key in either zone is released, a single ping is heard in the other zone and the 7- and 30-second reply periods are renewed.

Door Station Call

Communication with the door stations is similar to an intercom session, though there are significant differences. First, a door station has no ability to select a target zone. Instead, it simply rings the doorbell and a person in any zone can reply. Second, for privacy reasons the system doesn't allow a hands-free reply to a door station call from the interior keypads. The reply can be made only by pressing and holding the Talk key.

When the Call key on a door station is pressed, each hub instructs all connected keypads that aren't in DND mode to activate their speaker relays and connects the audio bus to their amplifiers. If a doorbell chime is selected on hub 1, the chime is played through the speaker outputs on those keypads and through the internal speakers in the door stations.

Pressing the Call key also causes the doorbell contacts to close for a minimum of 4 seconds to activate a separate doorbell or other device connected to the door station. The actual time varies with the doorbell selection on hub 1; the contacts remain closed for the duration of the selected chime.

Also, all keypads indicate which door station is calling, regardless of whether or not they're in DND mode. The indication remains for 15 seconds, during which the door station is selected at each keypad for reply.

Within the 15 seconds, a person at any keypad can then speak with the person at the door while holding in the Talk key. If the 15 seconds pass before the Talk key is pressed, the person inside will need to first select the door station on the keypad and then press the Talk key to start a new session. This will not activate the doorbell chime.

When a door call is answered from inside, the release of the Talk key at the keypad triggers a single ping at the door station to let the caller know they can reply. The person at the door station has a 7-second window for a hands-free reply after the single ping. The caller has the option of speaking within the 7 seconds or pressing and holding the Call key to speak longer. Holding in the Call key keeps the audio bus switched to the door station's microphone. If the 7-second hands-free window ends before the caller presses the Call key to speak, the door station sounds a double ping indicating the audio bus has opened. At this point the caller must press the Call key again to request another session if they wish to speak longer. This also rings the doorbell again.

Door Strike Release

The optional ISDR1 Door Strike Release module can be activated from any keypad at any time. When activated, the module stays active for 3 seconds, confirmed by a buzz tone at the keypad and the door station.

On an ISK1 Basic Keypad, the module is activated by pressing and holding the appropriate door key for 3 seconds.

When a communication session is active between a door station and an ISK2 Advanced Keypad, the module can be activated by pressing and holding both the Previous and Next keys for 3 seconds. If no session is active, the door will first need to be selected on the keypad.

Listen Mode

Listen mode is a system state in which one keypad has a constantly active microphone and one or more other keypads are receiving its audio signal. This mode is subject to temporary interruption when the system is used for paging, intercom, or door station sessions.

Selecting a keypad's own zone connects its microphone to the audio bus 2 seconds after the selection is made. That zone then becomes the sending zone for Listen mode. The keypad's Talk key lights up red to indicate the microphone is on. In addition, the zone key on an ISK1 Basic Keypad blinks red and the display on an ISK2 Advanced Keypad shows MicOn. If another zone is already selected as a sending zone for Listen mode, the keys on the Basic Keypad for both the active zone and the desired zone alternately blink red for 7 seconds to indicate which zone's microphone is active. The Advanced Keypad alternately displays the active zone and MicOn for 7 seconds.

Selecting the sending zone on other keypads connects their amplifiers to the audio bus so they can listen to the sending zone. Listen mode can be used with DND in the same zone as long as Listen mode is enabled first. On either type of keypad, selecting a zone other than its own cancels Listen mode.

Because Listen mode is the lowest priority communication, it can be interrupted by other functions, including an intercom session from the Listen mode sending keypad. When Listen mode is interrupted, the sending and receiving keypads give a system busy indication until the interruption is over.

If the audio bus is not available, attempting to activate a keypad's microphone for Listen mode will result in a system busy indication. Audible keypad volume level indication When the audio bus is inactive, pressing the Volume Up or Volume Down key on a keypad sounds a ping tone to audibly indicate the keypad's output level. As volume is increased the ping tone gets louder and vice versa. Once the volume adjustment reaches either end of the range, the ping tone no longer sounds.

System Busy

If someone attempts to start a page or intercom session when the system is busy, the Talk key on the keypad blinks red for 7 seconds to indicate the system is unavailable. The ISK2 Advanced Keypad display also flashes Busy at the same time.

Do Not Disturb (DND) Mode

Placing a zone in Do Not Disturb (DND) mode prevents the audio bus from being switched to the keypad amplifier in that zone. Thus, that zone will not receive any pages, intercom calls, door station calls, or doorbell chimes (unless a separate doorbell is used). However, DND mode will not prevent the zone from receiving audio from a multiroom audio system.

The volume setting in effect when a zone is put in DND mode is retained when DND is canceled. DND mode can be used in conjunction with Listen mode as long as Listen mode is selected first. If DND is selected first, pressing any key to enable Listen mode will exit DND mode. When a zone attempts an intercom session with a zone that is in DND mode, the DND key on the sending keypad blinks red for 7 seconds after the Talk key is pressed. Also, on the ISK1 Basic Keypad, the zone key for the zone in DND mode blinks red.

Keypad Backlight

The keypad backlighting comes on whenever any system function is activated and goes off after 60 seconds of system inactivity.

B. Communication Modes

Paging: P2 Communication.

Page is a system-wide broadcast mode and is amplified by all Paging Keypads that are is not in DND Mode. Zones in DND Mode still indicate the zone ID label for the sending zone. Paging will not be received by Door Stations at any time. When the audio bus is being used for intercom between zones and Door Stations (P1 corn) paging is not permitted. When sending a Page, the audio bus is connected to the microphone in the sending zone and is connected to the amplifier in all other zones (not in DND Mode).

a. Sending a Page: From either a Basic or Advanced Paging Keypad, press & hold the 'Talk' button then speak. Page will be the default selection for communication when the 'Talk' button is pressed and held when no other zone ID indicator (including Door Stations) is present.

i. ISK1 Basic Paging Keypads

1. When no zone ID is selected Page is the default target.

ii. ISK2 Advanced Paging Keypads

Have a specific 'Page' zone ID label which is available in the zone ID list as well as the default selection when the system is in-active and the 'Talk' button is pressed.

iii. System Busy

Visual indication on either type of keypad that the system is busy due to an ongoing P1 or P2 level communication (Door Station session, Intercom or Paging) will be made by flashing the Talk button red for 7 seconds.

a. ISK2 Advanced Paging Keypads will also flash the LCD label 'Busy' in the same manner and time.

b. Receiving and Replying to a Page: When receiving an incoming Page, all paging keypads will display the zone ID from where the Page originated. This will happen as soon as the page is initiated and will be displayed for the duration of 30 seconds after the 'Talk' button is released in the sending zone. Selection of the originating zone will also be retained during the 30 second time frame by all paging keypads so replies to the sending zone may be made by simply pressing the 'Talk' button without the need to select the original sending zone first. If the user wishes to send intercom to another zone instead of a reply, simply reselect a zone for intercom to. For sending a page instead of a reply, see below as there are differences between the ISK1 and ISK2. Zones in DND mode will not amplify the page but they will still indicate the zone ID where the page originated from if applicable (see ISK1 below) and retain selection of it during the 30 second window should they decide to exit DND mode and reply. Audible notification that the sender has released the 'Talk' button after a Page will be heard in receiving zones by a double beep. This indicates that the audio bus has opened and that a reply can now be sent.

i. ISK1 Basic Paging Keypads

1. Originating zone ID will be indicated by a backlit zone ID button—only if it is one of the other five zones sharing that ISH1 hub.

2. Reply with page—Deselect originating zone ID button first by pressing the zone ID button so it is not backlit red then press talk.

ii. ISK2 Advanced Paging Keypads

1. The zone ID will be indicated by displaying an assigned name on the LCD panel.

2. Reply with page—use previous and next buttons to select 'Page' then press talk.

Intercom: P2 Communication.

Intercom is a point to point form of communication and will only exist between two zones on a system unlike a page which is system wide. Communication to and from Door Stations is a form of intercom though there are significant differences so that is discussed below as a separate topic. Intercom operation allows hands-free replies for ease of use as well as manual replies.

a. Sending Intercom: To initiate an intercom session, select a target zone that is to receive the communication. Press and hold the 'Talk' button on the paging keypad then speak. Release the 'Talk' button when done. Audible confirmation by a single beep in the target zone indicates that a reply can now take place. The hands-free time will be cut short, the audio bus will be interrupted and the sending zone ID retained selection will be released if the following actions take place:

i. The sending or originating zone presses the 'Talk' button before the hands-free reply time expires ii. If any zone presses the 'Talk' button to initiate a global page (not intercom)

iii. ISK1 Basic Paging Keypad—Zone selection on Basic Paging Keypads is limited to the other 5 zones on the shared Hub. Target zone selection is made by pressing and releasing the zone ID button. Visual indication of a valid selection is presented by back-lighting the target zone ID button an alternate color. If a mistake is made in the selection, selection of a different zone ID button will clear the previous selection made. Pressing the same zone ID button after selection will de-select that as the target zone. If an invalid target zone is selected due to non-existence or it having DND enabled, the zone ID button will blink at 0.5 second intervals for 7 seconds. The zone ID label of the target (receiving) zone will remain displayed on the sending keypad and its selection will be actively retained for 30 seconds after the 'Talk' button is released. Alternately, in target zones receiving incoming intercom, the zone ID of the sending zone will be displayed and its selection (for reply) will be actively retained for 30 seconds after the 'Talk' button is released so that either can press 'Talk' to communicate to one another without re-selection.

iv. ISK2 Advanced Paging Keypad—Intercom target zone selection through an Advanced Paging Keypad is made by scrolling through the available options using the previous or next button to arrive at the zone ID desired. Non-existent zones IDs will not be available and therefore not displayed. If a zone is available but has DND enabled the name will be alternately displayed with 'DND' at a 1 second intervals. Once a target zone ID selection is made, press and hold the 'Talk' button then speak. Release the 'Talk' button when done. The zone ID label of the target (receiving) zone will remain displayed on the sending keypad and its selection will be actively retained for 30 seconds after the 'Talk' button is released. Alternately, in target zones receiving incoming intercom, the zone ID of the sending zone will be displayed and its selection (for reply) will be actively retained for 30 seconds after the 'Talk' button is released so that either can press 'Talk' to communicate to one another without re-selection.

v. System Busy

1. Visual indication on either type of keypad that the system is busy due to an ongoing P1 or P2 level communication (Door Station session, Intercom or Paging) will be made by flashing the Talk button red at 0.5 second intervals for 7 seconds.

a. ISK2 Advanced Paging Keypads will also flash the LCD label 'Busy' in the same manner and time.

b. Replying to Intercom:

i. ISK1 Basic Paging Keypad (single hub only)

ii. ISK2 Advanced Paging Keypad (multi-hub capable)

iii. Indication c. When receiving an intercom, target zones will display the zone ID from which zone the communication was sent. This will happen as soon as the intercom is initiated and will be displayed for the duration of 30 seconds after the 'Talk' button is released in the sending zone. Selection of the sending zone will also be retained during the 30 second time frame by the receiving zones keypad so replies to the sending zone may be made without the need to select the original sending zone first during this time frame. Upon the Talk buttons release by a sending zone, a single beep will be heard in both the sending and the receiving zones indicating that a reply can now be made. Two methods may be used to reply to an incoming intercom from either type of paging keypad. The first method is hands-free and the second is to manually press and hold 'Talk' for the duration of the reply. The target zone will permit hands free replies by activating the microphone for 7 seconds after the single beep. During this state, the 'Talk' button of the target keypad will be lit red to indicate that the microphone is active, similar to when in 'Listen Mode'. After the 7 seconds has expired a double beep will be heard by both the sending and target zones indicating that the time for hands free reply has expired. Replies after this time frame may still be made by pressing and holding the Talk button. This is allowed for the duration of 30 seconds after the Talk button is release for the last time. De-selection of the sending zone on target zone keypads will release the retained zone ID and cease hands free operation. The hands-free time will be cut short, the audio bus will be interrupted and the sending zone ID retained selection will be released if the following actions take place:

i. The sending or originating zone presses the 'Talk' button before the hands-free reply time expires ii. If any zone presses the 'Talk' button to initiate a global page (not intercom)

ISK3 Door Station Use: P1 Communication.

The door station allows a call request to be sent to inside paging keypads. It can activate a doorbell chime that is existing in the home already or the one built into the hub (unless a selection for none has been made at the hub) that will be sent out on the audio bus to all that hubs respective paging keypads. Door chime selection for each door station will be the same throughout the entire system. When call requests are answered by a paging keypad, a session begins. Paging keypads will not be capable of hands-free reply to door station call requests like other intercom functions. This is for privacy reasons and will require a manual acceptance of the door station request. Hands-free communication by the door stations is possible and will simplify use by visitors but there is a 7 second time limit on this which can be super ceded by pressing the 'Call' button when replying within the 7 second hands free time frame. When the session times out the paging keypad can intercom to the door station or another call request from the door station may be made to start another session. When a zone is in DND mode it will not hear the door bell chime, unless it is a separate one not built into the intercom system. The release of the 'Talk' button at the paging keypad will trigger a single beep so the door station has audible notification that they can reply. If the 7 second window for hands free expires at the door station, there will be a double beep indicating the audio bus has opened and the 'Call' button will need to be pressed again to request another session. If the door station 'Call' button is pressed and held during the 7 second window given for hands-free reply, the audio bus will remain switched to the microphone in the door station for the duration that the button is held. This is beneficial for longer conversations from the door station. When a paging keypad selects a door station a press and hold on the 'Talk' button will open a session also but there will be no door bell chime activation.

a. Call request by ISK3 Door Station

Door stations make a request for an intercom session by pressing their 'Call' button. Visual indication of the door station ID sending the request will be present on all paging keypads regardless of whether or not they are in DND mode and will be retained and displayed for 15 seconds total. Once acceptance of the request is made by a paging keypad, a session is opened between the paging keypad and the door station. Door stations will have hands-free reply capability for 7 seconds after the release of the 'Talk' button at the accepting paging keypad. If the 15 second time frame expires before a paging keypad can accept the request, reselection of the door station by a paging keypad will need to occur prior to pressing the 'Talk' button to reply to the original request or another request by the door station can be made to open another session. The hands-free time will be cut short, the audio bus will be interrupted and the sending zone ID retained selection will be released if the following actions take place:

i. The sending or originating zone presses the 'Talk' button before the hands-free reply time expires ii. If any zone presses the 'Talk' button to initiate a global page (not intercom)

b. Accept a request i. ISK1 Basic Paging Keypad ii. ISK2 Advanced Paging Keypad

When the 'Call' button on a Door Station is pressed the hub(s) will instruct all paging keypads that are not in DND mode to activate their speaker relay and connect the audio bus to the amplifier circuit. An internal doorbell chime will be heard through the speaker outputs on all paging keypads (again excluding those in DND mode and those which are connected to a hub with no doorbell selection) and through the internal speakers in the door stations. Inside stations will not have automatic hands free reply to the door station calls for privacy reasons. The 'Talk' button on paging keypads wishing to reply must be pressed within a 15 second time frame during which the door station indicator is present on the paging keypads.

ISDR1 Door Strike Release

When a session is active between a paging keypad and a door station the ISDR1 door strike release relay in line with the door station can be activated in the following manners:

i. Basic Paging Keypad—Basic Paging Keypad—At any time, press and hold the Door Station ID button for 3 seconds. The ISDR1 strike release relay will activate for 3 seconds with audio confirmation at the paging keypad by a tone.

ii. Advanced Paging Keypad—Advanced Paging Keypad—At any time, press and hold both the previous and next button for 3 seconds simultaneously. Otherwise scroll to the desired door station using either previous or next buttons. The ISDR1 strike release relay will activate for 3 seconds with audio confirmation at the paging keypad participating in the session by a tone.

Dnd Mode: Communication Blocker Up to Level P.

Do Not Disturb allows users to prevent distributed audio interruption in their room, door bell chimes, Door Station requests, Pages and intercom. Essentially, the audio bus will not be switched to the amplifier circuit in a paging keypad when it is in DND mode. Volume level upon enabling DND will be retained for reuse when DND is disabled. DND mode can be used in conjunction with Listen Mode but must be enabled after as pressing any buttons to enable Listen Mode will exit DND mode. Visual indications will still remain on keypads even when in DND mode.

a. Enable: To enable DND from either type of paging keypad, press and release the DND button b. Indication: The DND button will be backlit red when the DND mode is active to provide visual indication.

c. Disable: Any button press excluding Volume Up/Down will disable the DND mode.

d. Selection by other zones:

i. Both types of Paging Keypads—When a zone attempts to communicate by intercom with a zone that is in DND Mode, the 'DND' button on the sending paging keypad will blink red for the duration of 7 seconds after the 'Talk' button is pressed.

Listen Mode: Listen Mode has P3 Level Communication.

This allows a single zone in a system to have a constantly active microphone (this is the 'sending' zone) that other zones will be able to listen in on ('receiving' zone(s)). This mode is subject to temporary interruption when the system is used for intercom, paging or Door Station sessions so we should not imply its use as a 'baby monitor' as this could become a liable condition due to the temporary interruption. After interruption by a higher priority communication, the system busy indication will be displayed respectively for each type of keypad for the duration of the interruption. Once the interruption is over, Listen Mode will be reinstated as it previously was selected. In this mode, the microphone is connected to audio bus on the keypad in the sending zone 2 seconds after the selection is made. Multiple zones can simultaneously be receiving zones. The audio bus in receiving zones will be switched to their amplifier circuits when they select the sending zone. Listen Mode can be used with DND in the same zone though Listen Mode must be enabled first.

a. Sending zone Enable:

i. Basic Paging Keypads—To put a zone in Listen Mode with a Basic Paging Keypad, at the paging keypad in the sending zone (the one with the microphone active) select the zone ID button that is for that very zone. The sending zones Talk button and zone ID button will turn solid red backlighting for visual indication that the microphone is active. This indication is beneficial for identification and privacy reasons.

1. If a different zone is already in Listen Mode when an attempt is made to enable this feature, the desired zone ID button and the zone ID button where Listen Mode is active will alternately be backlit red in 0.5 second intervals for the duration of 7 seconds to indicate where the feature is already in use.

ii. Advanced Paging Keypads—To put zone in Listen Mode with an Advanced Paging Keypad, at the paging keypad in the sending zone (the one with the microphone active) use the previous or next button to select the sending zone (itself). The zone ID label will then switch to 'MicOn' after 2 seconds and will continue to display 'MicOn' for the duration that this zone is in listen mode. The MicOn label will not be available from other ISK2 keypads when a zone is already in Listen Mode. The sending zones Talk button will turn solid red backlighting for visual indication that the microphone is active.

1. If a different zone is already in Listen Mode when an attempt is made to enable this feature, the LCD will alternately display the zone ID of where the feature is active and 'MicOn' at 0.5 second intervals for the duration of 7 seconds to indicate where the feature is already in use.

b. Sending zone Indication:

i. Default state for Listen Mode active

1. ISK1 Basic—self ID button and Talk button will be solid red

2. ISK2 Advanced—'MicOn' displayed and Talk button solid red ii. Listen Mode suspended—Intercom in process 1. ISK1 & ISK2—Talk button red back light shuts off 2. Busy indication is present a. ISK1—flashing of the selected (self) zone ID button b. ISK2—Flashing 'Busy' displayed c. Sending zone Disable: On either type of paging keypad, selection of another zone other than itself will disable the Listen Mode.

d. Receiving zone enable:

i. Basic Paging Keypad—To become a receiving zone for Listen Mode, select the zone ID button for the sending zone. Selection of the sending zone ID button will be confirmed correct by initially blinking the zone ID button with red backlighting three times then remain solid red.

ii. Advanced Paging Keypad—To become a receiving zone for Listen mode, select the zone ID label of the zone that is sending using the previous or next button and the zone ID label will alternately toggle between the zone ID label and 'Listn'. This alternating display will continue as long as the active zone is selected. This indication will help identify which zone is in the Listen Mode so when a user wants to disable it they know what zone to go to.

iii. NOTE: If a zone enters listen mode, any other zone that is currently selected to that zone will be updated by the hub to indicate listen mode in the applicable manner.

e. Receiving zone indication i. Default state—Listen Mode Active

1. ISK1—Sending zone ID blinks three times then goes solid red for the duration that the sending zone for Listen Mode is selected 2. ISK2—Sending zone label alternately is displayed with the label 'Listn' for the duration that the sending zone for Listen Mode is selected ii. Listen Mode suspended—Intercom in process 1. ISK1—Busy indication (flashing the selected zone ID button) will be continuous for the duration of Listen Mode suspension 2. ISK2—Busy indication (flashing 'Busy' text) will be continuous for the duration of Listen Mode suspension f. Receiving zone disable of Listen Mode i. ISK1—Selection of a different zone or de-selection of the Listen Mode's sending zone will exit the receiving state of Listen Mode ii. ISK2—Selection of a different zone or Page will exit the receiving state of Listen Mode C. Summary It can now be understood that a system corresponding to the present invention uses a shared signal bus to carry power, data communication, and audio signals between various units. The types of units can include a basic paging keypad (ISK1), an advanced paging keypad (ISK2), a door station (ISK3), a hub unit (ISH1), and a door strike release module (ISDR1). The hub unit (ISH1) serves as the central controller for the intercom system. The other types of units are deployed in the system depending upon the user's requirements.

Each unit connected to the bus is given a unique address so that they may be individually instructed by a central hub unit as to their behavior. Unlike other systems, the distribution of audio in the system is half-duplex, such that only one audio signal is active on the bus at any one time. In other words, only one microphone is activated at any given time, although any number of receiving amplifiers/speakers may be active.

Audio, data communication, and power signals are provided between the hub and remote units using a CAT5 cable. A CAT5 cable contains four (4) twisted pairs of insulated solid copper conductors. In one embodiment of the system, a first wire pair is used as a plus and minus power connection. A second wire pair is used for a plus and minus audio signal connection. A third wire pair is used for data communication messaging. A fourth wire pair is used for sending a status signal and a door strike release signal.

Audio is sent out to all devices over the audio wire pair, in analog signal format. Only one unit is allowed to actively supply (i.e., "transmit") audio to the audio bus at any one time. However any number of receiver units may be active. Thus, any one ISK1, ISK2, or ISK3 device can individually be instructed to connect its corresponding microphone circuit to the audio bus. When one such device is actively sourcing the audio signal, all other devices are unable to do so: i.e., there is only one path for signals.

Determination of which unit is selected to be the transmitter occurs under the control of the hub. For example, in a case where a first user wishes to speak to another user in a different room, the first user presses a "talk" button at his ISK keypad. This causes the ISK unit to send out a message on the data communication bus to the hub. The message is sent as a low bit rate message according to a RS-485 serial data signaling protocol.

The hub unit then sends a reply on the data communication bus that grants permission to the first user's ISK to couple its microphone to the audio bus. The message is interpreted by the other stations as an instruction to keep their own microphones disconnected from the bus. A message is also sent to the desired receiving stations to couple their speakers to the bus to receive the audio signal.

Certain ISK stations can be interfaced with speakers associated with other room audio systems. This permits another audio system, such as perhaps the user's distributed home stereo system, to be used as a speaker output. In this instance, the system can interrupt the local home stereo audio to play a doorbell sound or an intercom page.

More particularly, an audio signal from an external music source (that is local to the remote unit) can be fed to a relay circuit at the ISK keypad unit. The audio signal from the local music source will normally pass through the ISK keypad unit and back to speakers within the local audio source, until the intercom is used. When this happens, the relay is activated to cause a door bell sound or voice to pass to the external audio system speakers that are now switched to the intercom amplifier output. Once the intercom function is over, then the relay is returned to its original position, to again permit audio from the remote music system to pass to the speakers.

The state of the relay in the remote unit is always controlled by the hub. The hub sends a message on the data communication bus that tells the remote keypad to activate the relay. This message is sent in response to a button press from another ISK keypad that gets sent to the hub via the same data communication bus. The hub also informs the other keypads whether or not they are to activate their respective relays. The keypads then pass the audio signal coming over the audio bus through the keypad amplifier to the relay contacts and out to the local room speakers.

While this invention has been particularly shown and described with references to example embodiments thereof, it will be understood by those skilled in the art that various changes in form and details may be made therein without departing from the scope of the invention encompassed by the appended claims.

What is claimed is:

1. An intercom system comprising:
   a hub unit;
   a plurality of zone units having respective local speakers;
   the hub unit and zone units interconnected by a cable with four twisted pair wires, with one of the twisted pairs serving as a control bus for sending control messages, and another designated one of the twisted pairs in the same cable serving as an audio bus for distributing, in two directions, intercom system audio signals between at least two of the zone units;
   wherein the hub unit controls connection of the zone units to the audio bus such that a first zone unit is connected to the audio bus to transmit intercom system audio to be received by multiple ones of the zone units in first direction, and so that a second zone unit is connected to the audio bus to transmit intercom system audio to be received by multiple ones of the zone units in a second direction; and
   wherein the hub unit also sends a control message to the receiving zone units to couple their respective local speakers to the audio bus, so that only a designated one or more zone units that are an intended receiver of the intercom system audio provide an output that is audible to a user.

2. The system of claim 1 wherein the zone units further comprise:
   an internal zone unit amplifier and an associated relay, the associated relay connected to control a pair of external stereo speakers, to connect external stereo speakers either to an external stereo audio system source or to the intercom system audio bus, in response to receiving a control message from the hub unit.

3. The system of claim 2 wherein the zone units further comprise:
   a zone unit volume control that adjusts an output volume level of the zone unit amplifier without affecting an output volume level of the external stereo audio source when heard through the external speakers.

4. The system of claim 2 wherein the relays in the zone units further switch the speakers from the external audio system source to the internal zone unit amplifier, momentarily interrupting the audio system program.

5. The system of claim 1 wherein the zone units are assigned unique addresses and the control messages are individually addressed by the central hub to specific zone unites.

6. The system of claim 1 wherein only one audio signal source in a zone unit is active on the audio bus at any one time, and more than one receiving speaker in other zone units may be active.

7. The system of claim 1 wherein determination of the hub unit of which zone unit is selected to be the transmitter occurs in response to a first user pressing a "talk" input button at his respective zone unit, which in turn causes the zone unit to send a corresponding message to the hub unit.

8. The system of claim 7 wherein the hub unit then sends a reply message on the control bus to grant permission to the first user's zone unit to couple a corresponding microphone to the audio bus.

9. The system of claim 8 wherein the reply message is received by other zone units as an instruction to keep their own respective microphones disconnected from the audio bus.

10. The system of claim 9 wherein the hub unit sends a control message to one or more desired receiving zone units to couple their speakers to the audio bus to receive the intercom audio signal.

11. The system of claim 1 wherein the zone units further receive an audio signal from a local audio system music source that is local to the zone unit, and the hub unit controls the zone unit such that an audio signal from the local audio system music source is normally connected to pass through the zone unit and back to local speakers external to the zone unit but associated with the local audio system music source, and wherein in response to an intercom system command, the hub unit interrupts the connection between the local audio system music source so that the local external speakers receive an intercom audio signal.

* * * * *

UNITED STATES PATENT AND TRADEMARK OFFICE
CERTIFICATE OF CORRECTION

| | | |
|---|---|---|
| PATENT NO. | : 8,189,753 B1 | Page 1 of 1 |
| APPLICATION NO. | : 12/082408 | |
| DATED | : May 29, 2012 | |
| INVENTOR(S) | : Roger P. Soucy, III et al. | |

It is certified that error appears in the above-identified patent and that said Letters Patent is hereby corrected as shown below:

On the Title Page, Item (60) in the Related U.S. Application Data section, please delete "Apr. 12, 7." and insert --Apr. 12, 2007.--

Signed and Sealed this
Eighteenth Day of February, 2014

Michelle K. Lee
*Deputy Director of the United States Patent and Trademark Office*